US012617016B2

(12) United States Patent
Zakotnik et al.

(10) Patent No.: US 12,617,016 B2
(45) Date of Patent: May 5, 2026

(54) SUB-MICRON PARTICLES OF RARE EARTH AND TRANSITION METALS AND ALLOYS, INCLUDING RARE EARTH MAGNET MATERIALS

(71) Applicant: URBAN MINING TECHNOLOGY COMPANY, INC., Perryville, MD (US)

(72) Inventors: Miha Zakotnik, Austin, TX (US); Davide Prosperi, Austin, TX (US); Gojmir Furlan, Austin, TX (US); Catalina O. Tudor, Austin, TX (US); Alex Ivor Bevan, Austin, TX (US)

(73) Assignee: Noveon Magnetics Inc., San Marcos, TX (US)

( * ) Notice: Subject to any disclaimer, the term of this patent is extended or adjusted under 35 U.S.C. 154(b) by 521 days.

(21) Appl. No.: 17/564,634

(22) Filed: Dec. 29, 2021

(65) Prior Publication Data

US 2022/0203444 A1 Jun. 30, 2022

Related U.S. Application Data

(62) Division of application No. 16/325,865, filed as application No. PCT/US2017/047108 on Aug. 16, 2017, now Pat. No. 11,213,890.

(Continued)

(51) Int. Cl.
*B22F 9/08* (2006.01)
*B22F 1/052* (2022.01)

(Continued)

(52) U.S. Cl.
CPC .............. *B22F 9/082* (2013.01); *B22F 1/056* (2022.01); *B22F 1/065* (2022.01); *H01F 1/0571* (2013.01);

(Continued)

(58) Field of Classification Search
CPC ............ B22F 2301/355; B22F 2301/45; B22F 2301/155; B22F 2304/056;

(Continued)

(56) References Cited

U.S. PATENT DOCUMENTS 3,695,795 A 10/1972 Jossick
3,719,733 A * 3/1973 Rakestraw ............ C03B 19/109 264/9

(Continued)

FOREIGN PATENT DOCUMENTS

CN 203265636 U * 11/2013
CN 104036945 A 9/2014

(Continued)

OTHER PUBLICATIONS

Li et al. Waste Nd—Fe—B Sintered Magnet Recycling by Doping With Rare Earth Rich Alloys. IEEE Transactions on Magnetics. vol. 50. No. 12. Dec. 2014. 2105403. (Year: 2014).*

(Continued)

*Primary Examiner* — Keith Walker
*Assistant Examiner* — Stephani Hill
(74) *Attorney, Agent, or Firm* — BakerHostetler

(57) ABSTRACT

The present disclosure is directed to methods of preparing substantially spherical metallic alloyed particles, having micron and sub-micron (i.e., nanometer)-scaled dimensions, and the powders so prepared, as well as articles derived from these powders. In particular embodiments, these metallic alloyed particles, comprising rare earth metals, can be prepared in sizes as small 80 nm in diameter with size variances as low as 2-5%.

14 Claims, 6 Drawing Sheets

Related U.S. Application Data

(60) Provisional application No. 62/375,943, filed on Aug. 17, 2016, provisional application No. 62/375,947, filed on Aug. 17, 2016.

(51) Int. Cl.

| | |
|---|---|
| ***B22F 1/054*** | (2022.01) |
| ***B22F 1/065*** | (2022.01) |
| ***H01F 1/057*** | (2006.01) |
| ***H01F 41/02*** | (2006.01) |

(52) U.S. Cl.
CPC .......... *H01F 41/0253* (2013.01); *B22F 1/052* (2022.01); *B22F 2009/0824* (2013.01); *B22F 2009/088* (2013.01); *B22F 2009/0884* (2013.01); *B22F 2009/0888* (2013.01); *B22F 2009/0892* (2013.01); *B22F 2301/355* (2013.01); *B22F 2304/056* (2013.01); *C22C 2202/02* (2013.01)

(58) Field of Classification Search
CPC ...................... B22F 2304/058; B22F 2304/10; B22F 9/082; B22F 2009/0824
See application file for complete search history.

(56) References Cited

U.S. PATENT DOCUMENTS

| | | | | | |
|---|---|---|---|---|---|
| 4,437,883 | A | * | 3/1984 | Kubo | B22F 9/082 75/337 |
| 4,656,331 | A | | 4/1987 | Lillquist et al. | |
| 5,263,689 | A | | 11/1993 | Menzies et al. | |
| 5,340,377 | A | | 8/1994 | Accary et al. | |
| 5,888,416 | A | | 3/1999 | Ikuma et al. | |
| 5,935,461 | A | * | 8/1999 | Witherspoon | H01J 37/32 75/346 |
| 6,022,424 | A | | 2/2000 | Sellers et al. | |
| 6,808,677 | B2 | | 10/2004 | Konishi | |
| 7,571,757 | B2 | | 8/2009 | Sasaki | |
| 8,961,868 | B2 | | 2/2015 | Miyoshi | |
| 9,044,834 | B2 | | 6/2015 | Zakotnik et al. | |
| 9,067,284 | B2 | | 6/2015 | Zakotnik et al. | |
| 9,095,940 | B2 | | 8/2015 | Zakotnik et al. | |
| 9,144,865 | B2 | | 9/2015 | Zakotnik et al. | |
| 9,336,932 | B1 | | 5/2016 | Zakotnik et al. | |
| 10,926,333 | B2 | | 2/2021 | Zakotnik et al. | |
| 10,963,333 | B1 | | 3/2021 | Nijim et al. | |
| 11,607,731 | B2 | | 3/2023 | Zakotnik et al. | |
| 2002/0092376 | A1 | | 7/2002 | Nozawa | |
| 2006/0054245 | A1 | | 3/2006 | Liu et al. | |
| 2008/0141827 | A1 | | 6/2008 | McWhorter | |
| 2009/0035171 | A1 | | 2/2009 | Kawamura et al. | |
| 2015/0294786 | A1 | | 10/2015 | Zakotnik et al. | |

FOREIGN PATENT DOCUMENTS

| | | | | | |
|---|---|---|---|---|---|
| CN | 104112580 | A | * | 10/2014 | |
| CN | 105529123 | A | * | 4/2016 | |
| DE | 112007000673 | B4 | | 1/2015 | |
| EP | 0017723 | A1 | | 10/1980 | |
| FR | 2887162 | A1 | | 12/2006 | |
| JP | 3432858 | B2 | | 8/2003 | |
| JP | 2004-137582 | A | | 5/2004 | |
| JP | 2013207134 | A | * | 10/2013 | |
| KR | 20150090377 | | * | 8/2015 | |
| WO | 92/05903 | A1 | | 4/1992 | |
| WO | 2014/205002 | A2 | | 12/2014 | |
| WO | 2015/093672 | A1 | | 6/2015 | |
| WO | 2016/025794 | A1 | | 2/2016 | |
| WO | 2017/132075 | A1 | | 8/2017 | |
| WO | 2018/035202 | A1 | | 2/2018 | |
| WO | WO-2018035205 | A1 | * | 2/2018 | B22F 1/065 |

OTHER PUBLICATIONS

Li et al. (Waste Nd—Fe—B Sintered Magnet Recycling by Doping with Rare Earth Rich Alloys), IEEE Transactions on Magnetics, vol. 50, No. 12, Dec. 2014 (Year: 2014).

Zakotnik et al: "Commercial scale recycling of NdFeB-type magnets with grain boundary modification yields products with 'designer properties' that exceed those of starting materials", Waste Management., vol. 44, Oct. 1, 2015, pp. 48-54.

* cited by examiner

SUB-MICRON PARTICLES OF RARE EARTH AND TRANSITION METALS AND ALLOYS, INCLUDING RARE EARTH MAGNET MATERIALS

CROSS REFERENCE TO RELATED APPLICATIONS

The present application is a Divisional Application of U.S. patent application Ser. No. 16/325,865 filed Feb. 15, 2019, which is the National Stage Application filed under 35 US.C. 371 of International Patent Application No. PCT/US2017/047108 filed Aug. 16, 2017, which claims the benefit of priority to U.S. Provisional Application Nos. 62/375,947 and 62/375,943, both filed Aug. 17, 2016, the contents of which are both incorporated by reference in their entirety for all purposes.

TECHNICAL FIELD

The present disclosure is directed to micron and sub-micron sized metal and metallic alloy powders and methods of making the same.

BACKGROUND

Powder metallurgy describes processes in which metal powders are used to produce a wide range of materials or components. Such powder processes can avoid, or greatly reduce, the need to use post-forming metal removal processes, thereby drastically reducing yield losses in manufacture and can often result in lower manufacturing costs. Moreover, these powder processes provide means by which compositionally complex materials can be made homogeneously. Typically, in such applications, fine metal powders of individual metals are mixed with binders, such as lubricant wax or metallic grain boundary-forming metal, and compressed into a “green body” of the desired shape, and then the green body is heated in a controlled atmosphere to bond the material by sintering. Variations on this process includes powder forging, hot isostatic pressing (HIP), metal injection molding, electric current assisted sintering (ECAS), additive manufacturing (AM). Other processes include, selective laser sintering (SLS), selective laser melting (SLM), and electron beam melting (EBM). Alternatively, processed magnetic powders can be incorporated into bonded magnets. In their most basic form, bonded magnets may be seen as a polymer composite, comprising a hard magnetic powder and a non-magnetic polymer or rubber binder. Bonded magnets may be processed by any means used to prepare filled polymer composites, for example, calendering, injection molding, extrusion and compression bonding, and as such offer the advantages seen with processing such composites, for example near final shape forming.

The chemical and physical homogeneity of the precursor powders is, in either case, critical to the formation and ultimate performance of materials made through a powder metallurgical route. It is desirable, for example, to provide mixtures of metal powder particles with specific particle size ranges, preferably with one or more mono-dispersed size distributions, each having, narrow variances with respect to the mean particle size (e.g., bi-, tri-, or polymodal distributions of specific individually monodispersed particles) for efficiency of packing or mixing. In other applications, mixtures of compositionally different powders, each having different particle size distributions, provide attractive options for blending, for example, discrete larger-sized grain and smaller-sized grain boundary materials.

Likewise, compositional homogeneity within an individual powder particle, especially for complex alloys, ultimately provides sintered bodies having superior-compositional consistency throughout the sintered body, and so improved performance of that body It is also desirable that such powder particles are processed in the absence of oxidizing or carbon-containing conditions to minimize the presence of these contaminants in the final sintered bodies.

For example, such powder forming methods are useful in the preparation of Neodymium, Iron, Boron (NdFeB), and other compositionally complex, magnets. The performance of such magnetic materials have been shown to depend quite significantly on the homogeneity of the sintered magnetic body, and this homogeneity can, at least in part, be attributed to the size and compositional homogeneity of the precursor powder particles. Further, the supply of rare earth elements, in particular dysprosium (Dy) and terbium (Tb), which are required for increased magnetic performance, is scarce, and the ability to provide intimate and homogeneous mixtures of particles of different sizes and compositions allows for the less use of these scarcer materials.

Presently, typical processes for preparing powders for such applications include melt processing of the desired alloys, followed by pulverizing and, in some cases, decrepitation steps, and sieving to achieve particles within a desired size window. Pulverizing is typically done using tumble mixers, optionally in the presence of pulverizing media. Decrepitation involves the treatment of the pulverized metallic alloy particles with hydrogen under conditions and for a time to allow absorption of the hydrogen into the alloy, followed by an outgassing treatment. Combinations of pulverizing and decrepitation steps, followed by sieving is an effective, albeit time-consuming, method of provide powders. But even in these cases, the particle size distributions of the resulting powders are typically defined by the openings in the sieve, and not necessarily constant from batch-to-batch. Similarly, such particles typically contain angular edges, leading to inefficiencies in green body packing. Moreover, such excessive handling provides opportunities for ingress of oxygen and other contaminants. Even further, such methods are practically limited in the particle sizes available; e.g., particles less than 3 microns are difficult to control by such methods.

The present invention addresses at least some of these issues and describes substantially spherical metallic and/or compositionally diverse metallic alloy powder particles and methods of making these powders, and articles derived therefrom.

SUMMARY

The present disclosure describes compositions comprising a plurality of substantially spherical particles of metals or metallic (metal-containing) alloys, and methods of making the same. In certain embodiments, the compositions comprise a plurality of substantially spherical particles of a metal or metallic alloy, the particles having a mean particle size in a range of 80 nm to 500 microns. In certain specific embodiments, the mean particle size is less than 1 micron (e.g., 50 nm to less than 1000 nm). In related embodiments, each particle comprises at least one rare earth element in an amount in a range of from about 10 wt % to 99 wt %, relative to the total weight of the particle, though in other embodiments, the particles are substantially free of such rare earth elements.

In some embodiments, the plurality of substantially spherical particles is present in snore unimodal (monomodal) distribution, for example, in a bimodal, trimodal, or polymodal distribution. Within each unimodal (monomodal) distribution, the size variance may be in the range of about 2 percent to about 50 percent, preferably at the low end of this range. The particle size distributions may be Gaussian or skewed. Each unimodal (monomodal) distribution may comprise particles that are compositionally the same or different.

While the disclosure is not necessarily limited to the specific materials, in certain embodiments, the particles contain at least one rare earth element is present in an amount in at least one range of from 10 to 99 wt %, relative to the total weight of the particle, or various sub-ranges within this general range. In some embodiments, the at least one rare earth element is or comprises Nd, Dy, Pr, Tb, or a combination thereof. The particles may further contain at least one transition metal, and/or at least one main group element. Preferably, the particles comprise mixtures of multiple rare earth and transition metals, and specific exemplary compositions are described herein.

In some embodiments, the substantially spherical particles have a combined carbon and oxygen content in a range of from 0 to 1700 ppm by weight relative to the entire weight of the particle. These particles may individually have an oxygen content in a range of from 0 to 900 ppm by weight or a carbon content in a range of from 0 to 1400 or 0 to 800 ppm by weight, or both relative to the entire weight of the particle. Methods of determining these oxygen and carbon contents are described herein.

This disclosure also includes embodiments which may be useful for preparing such compositions. In some embodiments, the method comprises injecting a quantity of a molten/liquid metallic alloy into an inert fluid stream under appropriate reaction conditions so as to produce a dispersion of substantially spherical solid particles of the metallic alloy within the inert fluid stream, the particles having the desired mean particle size in a range of 80 nm to 500 microns, or having a mean particle size of 1 micron or less. In some embodiments, the inert fluid stream has a velocity in a range of from about 0.2 km/sec to about 10.5 km/sec. The size of the particles is tunable by this method, the size of the resulting particles depending on the velocity, heat capacity, cooling rate, etc. of the fluid used to prepare them. In some embodiments, the fluid comprises or consists of nitrogen, argon, helium, or hydrogen and is preferably a liquid, but may also be a gas, or mixture of one or more gas and liquids.

In other embodiments, the stream of a molten or liquid metal or metallic alloy is subjected to impingement by one or more oblique streams (e.g., jet or spray) of one or more inert fluids. The molten or liquid metal or metallic alloy and the one or more oblique streams of inert fluid(s) may be introduced to one another by any suitable spray means or nozzle or gravity. The molten/liquid metallic alloy may be introduced to the inert fluid stream(s) in a hot zone of a tangential reactor, where the hot zone may be maintained at a temperature controlled to within ±10° C. variance or within ±5% of a set temperature. Once formed, the substantially spherical solid particles of the metal or metallic alloy are separated from the inert fluid stream by gravity and/or filtration.

Still other embodiments include those green bodies comprising or sintered bodies derived from the use of any of the particles, especially those containing the <3 micron and sub-micron particles (e.g., 100-200 nm particles), described herein, as well as devices incorporating these sintered bodies.

Other embodiments, include those bonded magnets comprising from the use of any of the particles, especially those containing the <3 micron and sub-micron particles (e.g., 100-200 nm particles), described herein, as well as devices incorporating these bonded magnets.

BRIEF DESCRIPTION OF THE DRAWINGS

The present application is further understood when read in conjunction with the appended drawings. For the purpose of illustrating the subject matter, there are shown in the drawings exemplary embodiments of the subject matter, however, while each represents an embodiment of the present disclosure, the presently disclosed subject matter is not limited to the specific methods, devices, and systems disclosed. In addition, the drawings are not necessarily drawn to scale. In the drawings.

DETAILED DESCRIPTION OF ILLUSTRATIVE EMBODIMENTS

Figure 1:
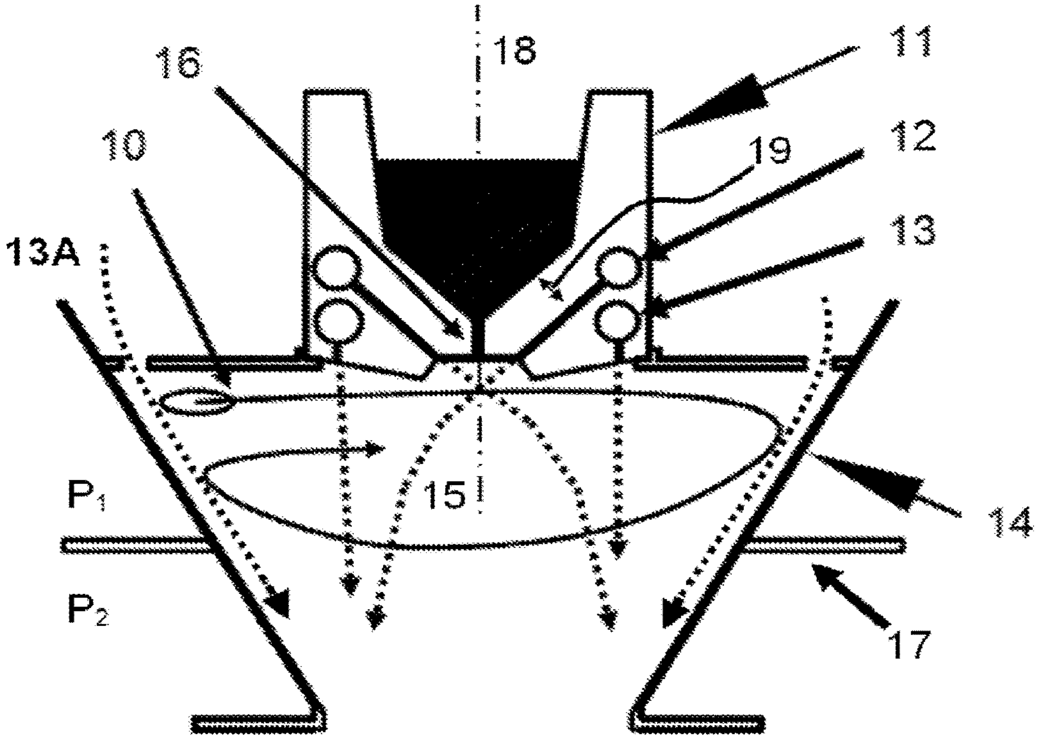
FIG. 1 shows one embodiment of a tangential reactor useful in preparing the powders of the present disclosure.
Figure 2:
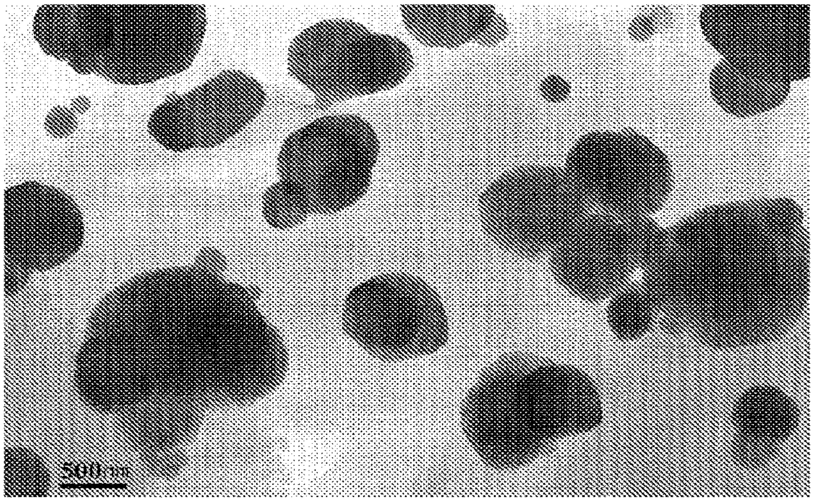
FIG. 2 provides a transmission election micrograph of particles comprising an alloy comprising Nd, Tb, Dy, Co, and Fe prepared by the disclosed methods. In this figure, the mean particle size is 500 nm.

The present invention is directed to methods of preparing substantially spherical metallic and metallic alloyed particles, having micron and submicron (i.e., nanometer)-scaled dimensions, and the powders so prepared. In some cases, the homogeneity of the powders or particles, both within an individual particle, but especially when considering a population of particles, is far superior than that currently available by other methods. In other cases, the shape of the particles, coupled with the size homogeneity within particle populations, especially at low particle dimensions is also superior to those powders available by other materials. In some embodiments, the powders/particles comprise rare earth metals having defined composition ranges and/or elevated levels, relative to typical magnetic compositions (i.e., as grain boundary materials); in other embodiments, the methods and powders/particles are substantially free of rare earth elements. Each of these features, and others are described herein.

Compositions

Certain embodiments of the present disclosure comprise a plurality of substantially spherical particles of a metal or metallic alloy, the particles having a mean particle size in a range of 80 nm to 500 microns. Independent embodiments include particles defined by particle size distributions having mean values comprising one or more sub-ranges of from 80 nm to 100 nm, from 100 nm to 120 nm, from 120 nm to 140 nm, from 140 nm to 160 nm, from 160 nm to 180 nm, from 180 nm to 200 nm, from 200 nm to 300 nm, from 300 nm to 400 nm, from 400 nm to 500 nm, from 500 nm to 600 nm, from 600 nm to 700 nm, from 700 nm to 800 nm, from 800 nm to 900 nm, from 900 nm to 1000 nm, from 1 micron to 2 microns, from 2 microns to 5 microns, from 5 microns to 10 microns, from 10 microns to 50 microns, from 50 microns to 100 microns, from 100 microns to 200 microns, from 200 microns to 300 microns, from 300 microns to 400 microns, from 400 microns to 500 microns. In certain embodiments, these particles may be defined in terms of particles having combinations of these ranges, for example, of from 80 nm to 180 nm, from 100 to 140 nm, or other combinations of the defined sub-ranges. Particle sizes and distributions are defined herein by commercially available particle size analyzers, in which samples of the produced powder are analyzed as representative of the whole population (typically derived from more than 3 randomly selected powder samples) by measuring the mean diameters of the particles, counting particles within a predetermined size fraction gradient, and statistically correlating those numbers. The term “substantially spherical” is defined elsewhere herein.

The compositions may comprise particles of a given composition present in the composition in at least one unimodal (or monomodal) distribution (the terms “unimodal” and “monomodal” both referring to a distribution having a single maximum). As prepared, it is typical that a single unimodal distribution of a given composition of particles is formed, but the present disclosure contemplates the blending of two or more such powders, each having the same or different compositions and particle sizes. Such blending may be useful, for example, in enhancing packing efficiencies and/or in preparing compositions having different grain and grain boundary compositions. In such cases, the compositions of at least one type of set of particles having a unimodal (or monomodal) distribution in may be present in a mixture having bimodal, trimodal, or polymodal distribution of it and other particles. Each of the unimodal (or monomodal) distribution within the bimodal, tri modal, or polymodal distribution may comprise particles of the same or different chemical composition. Individual populations of the substantially spherical particles of a metal or metallic alloy, defined by the parameters described herein, may also be blended with particles of other sources, for example, where the methods of preparing these other sourced particles have wider or narrower particle size distributions, and/or similar or dissimilar shapes (e g., where the particles contain angular edges).

The methods used to derive these particle distributions allow for the careful control of size distributions, and in some embodiments, some or each of the at least one unimodal (or monomodal) distribution can exhibit a size variance in the range of about 2 percent to about 100 percent, where size variance is defined as the standard deviation of the particle size distribution divided by the average size of the particles in the particle size distribution. In related embodiments, the size variances may be defined by one or more ranges of from about 2% to 5%, from 5% to 10%, from 10% to 15%, from 15% to 20%, from 20% to 25%, from 25% to 30%, from 30% to 35%, from 15% to 40%, from 40% to 45%, from 45% to 50%, or higher. In related embodiments, the size variance is in a range of from about 2 percent to about 25 percent, from about 2 percent to about 10 percent, or from about 2 percent to about 5 percent.

In some embodiments, the unimodal distribution is a Gaussian distribution. In other embodiments, the distribution may be statistically skewed with particles of higher or lower particle mean diameters.

The plurality of substantially spherical particles may comprise individual metals (including rare earth and/or transition metals) or mixed alloys of or compositions comprising such metals. In certain of these embodiments, the particles comprise at least one rare earth element or transition metal in an amount in a range of from about 10 wt % to about 100 wt %, relative to the total weight of the particle. Quantitative determinations of rare earth metals within an individual particle or particle population may be determined by any of several methods known to those skilled in the metallurgical arts. In some embodiments, the rare earth element(s) may be present in an amount defined by a range comprising one or more of the subranges of from about 10 wt % to 15 wt %, from 15 wt % to 20 from 20 wt % to 25 wt %, from 25 wt % to 30 wt %, from 30 wt % to 35 wt %, from 35 wt % to 40 wt %, from 40 wt % to 50 wt %, from 50 wt % to 60 wt %, from 60 wt % to 70 wt %, from 70 wt % to 80 wt %, from 80 wt % to 90 wt %, from 90 wt % to 95 wt %, from 95 wt % to 98 wt %, from 98 wt % to 99 wt %, from 99 wt % to about 100 wt %, and each relative to the total weight of the particle.

In some embodiments, the particles comprise at least one rare earth element in related embodiments, the particles may comprise 2, 3, 4, 5, 6, or more rare earth elements. As contemplated herein, the term “rare earth element” connotes one or more of the lanthanide and actinide series, for example including La, Ce, Pr, Nd, Pm, Sm, Eu, Gd, Tb, Dy, Ho, Er, Tm, Yb, and Lu, or a combination thereof. Subset groups of such rare earth metals may also exclude one or more of those listed. In specific individual embodiments, the composition may comprise Nd, Dy, Pr, Tb, or a combination thereof.

In some embodiments, the particles may also or instead comprise at least one transition metal element, where the term transition metal refers to a d-block element, such as among Groups 3 to 12, preferably among the Groups 8 to 12, of the periodic table. As such, transition metals may be defined as including Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, and Hg. In specific embodiments, the at least one transition metal comprises one or more of Ag, Au, Co, Cu, Fe, Ga, Mo, Ni, Ti, V, W, Y, Zn, and Zr. Subset groups of such transition metals may also exclude one or more of the listed metals. Additional subsets contain one or more of Fe, Co, Cu, and/or Zn.

In certain embodiments, the compositions comprise particles having a grain boundary material (GBM) alloy composition defined as described in International Application Nos. PCT/US2014/042805, filed Jun. 17, 2014, and PCT/US2015/045206, filed Aug. 14, 2015, or in U.S. patent application Ser. No. 14/307,267, filed Jun. 17, 2014, Ser. No. 14/448,823, filed Jul. 31, 2014, Ser. No. 14/543,210, filed Nov. 17, 2014, Ser. No. 14/543,296, filed Nov. 17, 2014, Ser.

No. 14/742,080, filed Jun. 17, 2015, and Ser. No. 14/751,442, filed Jun. 26, 2015, and 62/324,501, filed Apr. 19, 2016. Each of these is incorporated by reference in its entirety for all purposes, but at least for its descriptions of particle compositions, methods of making, and subsequent uses.

In some embodiments, the composition of the alloys may contain or be substantially described as $Nd_{1-20}Dy_{1-60}Co_{1-60}Co_{0.1-20}Fe_{0.5-90}$ at. % or $Nd_{1-14}Dy_{30-50}Co_{25-45}Cu_{1-10}Fe_{1-10}$ at. % or $Nd_{8.5-12.5}Dy_{35-45}Co_{32-41}Cu_{3-6.5}Fe_{1.5-5}$ atom %. In certain individual embodiments, the contents of Nd, Dy, Co, Cu, and Fe are independently provided as:

- for Nd, is a range comprising one or more ranges including those from 1 to 20 atom % in increments of 0.5 atom %, also including one or more ranges including those from 1 to 2, from 2 to 3, from 3 to 4, from 4 to 5, from 5 to 6, from 6 to 7, from 7 to 8, from 8 to 9, from 9 to 10, from 10 from 11 to 12, from 12 to 13, from 13 to 14, from 14 to 15, from 15 to 16, from 16 to 17, from 17 to 18, from 18 to 19, and/or from 19 to 20 atom %;
- for Dy, is in a range comprising one or more ranges including those from 1 to 60 atom in increments of 0.5 atom %, also including one or more ranges including those from 1 to 2, from 2 to 6, from 6 to 10, from 10 to 14, from 14 to 18, from 18 to 22, from 22 to 26, from 26 to 30, from 30 to 34, from 34 to 38, from 38 to 42, from 42 to 46, from 46 to 50, from 50 to 54, from 54 to 58, and/or from 58 to 60 atom %;
- for Co, is in a range comprising one or more ranges including those from 1 to 60 atom % in increments of 0.5 atom %, also including one or more ranges including those from 1 to from 2 to 6, from 6 to 10, from 10 to 14, from 14 to 18, from 18 to 22, from 22 to 26, from 26 to 30, from 30 to 34, from 34 to 38, from 38 to 42, from 42 to 46, from 46 to 50, from 50 to 54, from 54 to 58, and/or from 58 to 60 atom %;
- for Cu, is in a range comprising one or more ranges including those from 0.1 to 20 atom % in increments of 0.5 atom %, also including one or more ranges including those from 0.1 to 0.2, from 0.2 to 0.4, from 0.4 to 0.6, from 0.6 to 0.8, from 0.8 to 1, from 1 to 2, from 2 to 3, from 3 to 4, from 4 to 5, from 5 to 6, from 6 to 7, from 7 to 8, from 8 to 9, from 9 to 10, from 10 to 11, from 11 to 12, from 12 to 13, from 13 to 14, from 14 to 15, from 15 to 16, from 16 to 17, from 17 to 18, from 18 to 19, and/or from 19 to 20 atom %;
- for Fe, is in a range composing one or more ranges including those from 0.5 to 90 atom % in increments of 0.5 atom %, also including one or more ranges including those from 0.1 to 0.2, from 0.2 to 0.4, from 0.4 to 0.6, from 0.6 to 0.8, from 0.8 to 1, from 1 to 2, from 2 to 3, from 3 to 4, from 4 to 5, from 5 to 6, from 6 to 7, from to 8, from 8 to 9, from 9 to 10, from 10 to 20, from 20 to 30, from 30 to 40, from 40 to 50, from 50 to 60, from 60 to 70, from 70 to 80, and/or from 80 to 90 atom %. In some embodiments, these compositions are rich in Dy (greater than 30 atom %) and/or have this Dy optionally substituted in part by Tb). In other embodiments, the compositions are independently enriched in Co or Cu. Still other embodiments are those described in the Examples.

In other embodiments, the alloy composition is chemically represented as having one or more of:

(1) an amount of Nd in a range of from 6.1717 to 11.8917 atom %, inclusive;

(2) an amount of Pr in a range of from 1.5495 to 4.821 atom %, inclusive, or (3) an amount of Dy in a range of from 0.2132 to 5.3753 atom %), inclusive, and (4) an amount of Co in a range of from 0 to 4.0948 atom %, inclusive, (5) an amount of Cu in a range of from 0.0545 to 0.2445 atom %, inclusive, and (6) an amount of Fe in a range of from 81.1749 to 85.867 atom %, inclusive.

In certain aspects of these embodiments, the combination of Nd, Pr, and Dy is in a range of from 13.236 to 16.407 atom %, inclusive. In other aspects, the composition comprises at least Nd. In still other aspects, the composition comprises Nd and Dy. In still other aspects, the composition comprises both Nd and Pr.

In still other embodiments, the chemical composition of the alloy is or contains an alloy substantially represented by the formula $AC_bR_xCo_yCu_dM_z$, wherein:

(A) AC comprises Nd and Pr in an atomic ratio in a range of from 0:100 to 100:0, and b is a value in a range of from about 5 atom % to about 65 atom %;

(B) R is one or more rare earth elements including one or both of Tb and Dy and x is a value in a value in a range of from about 5 atom % to about 75 atom %;

(C) Co is cobalt and Cu is copper;

(D) y is a value in a range of from about 20 atom % to about 60 atom %;

(E) d is a value in a range of from about 0.01 atom % to about 12 atom %;

(F) M is at least one transition metal element, exclusive of Cu and Co, and z is a value in a range of from about 0.01 atom % to about 18 atom %; and (G) b, x, y, d, and z are independently variable within their stated ranges provided that the sum of b+x+y+d+z is greater than 95, 98, 99, 99.5, 99.8, or 99.9 atom % to about 99.9 atom % or 100 atom %.

In certain independent aspects of these embodiments:

- R is Nd, Pr, La, Ce, Gd, Ho, Er, Yb, Dy, Tb, or a combination of 2 or more of these separate elements, especially Dy and Tb;
- x is a value in one or more ranges including those from 5 to 10 atom %, 10 to 15 atom %, 15 to 20 atom %, 20 to 25 atom %, 25 to 30 atom %, 30 to 35 atom %, 35 to 40 atom %, 40 to 45 atom %, 45 to 50 atom %, 50 to 55 atom %, 55 to 60 atom %, 60 to 65 atom %, 65 to 70 atom %, 70 to 75 atom %, for example, from 30 to 60 atom % or from 10 to 60 atom %.
- y is a value in in one or more ranges including those from 20 to 25 atom %, 25 to 30 atom %, 30 to 35 atom %, 35 to 40 atom %, 40 to 45 atom %, 45 to 50 atom %, 50 to 55 atom %, 55 to 60 atom %, for example from 30 to 40 atom % or from 32 to 46 atom %.
- d is a range in one or more ranges including those from 0.01 to 0.05 atom %, 0.05 to 0.1 atom %, 0.1 to 0.15 atom %, 0.15 to 0.2 atom %, 0.2 to 0.25 atom %, 0.25 to 0.5 atom %, 0.5 to 1 atom %, 1 to 1.5 atom %, 1.5 to 2 atom %, 2 to 2.5 atom %, 2.5 to 3 atom %, 3 to 3.5 atom %, 3.5 to 4 atom %, 4 to 4.5 atom %, 4.5 to 5 atom %, 5 to 5.5 atom %, 5.5 to 6 atom %, 6 to 7 atom %, 7 to 8 atom %, 8 to 9 atom %, 9 to 10 atom %, 10 to 11 atom %, 11 to 12 atom %, 12 to 13 atom %, 13 to 14 atom %, 14 to 15 atom %. For example, in one exemplary combination range, Cu is present in a range of from 0.01 to 6 atom %. Other embodiments include those where the range is defined by one tenth integer values within these ranges, for example from about 3.1 to about 8.9 atom %.

M is at least one transition metal element, exclusive of Cu and Co, and is present in the first GBE alloy in an amount ranging from about 0.01 atom % to about 18 atom %. The presence of low levels of Zr in the presence of Fe appears to provide specific benefits described herein.

In still other embodiments, the chemical composition of the alloy is or contains an alloy substantially represented by the formula $Nd_jDy_kCo_mCu_nFe_p$, wherein:

j is atomic percent in a range from 1 to 2, from 2 to 3, from 3 to 4, from 4 to 5, from 5 to 6, from 6 to 7, from 7 to 8, from 8 to 9, from 9 to 10, from 10 to 11, from 11 to 12, from 12 to 13, from 13 to 14, from 14 to 15, from 15 to 16, from 16 to 17, from 17 to 18, from 18 to 19, from 19 to 20 atom % or a range comprising two or more of these ranges, relative to the entire composition;

k is atomic percent in a range from 1 to 5, from 5 to 10, from 10 to 15, from 15 to 20, from 20 to 25, from 25 to 30, from 30 to 35, from 35 to 40, from 40 to 45, from 45 to 50, from 50 to 55, from 55 to 60 atom % or a range comprising two or more of these ranges, relative to the entire composition;

m is atomic percent in a range from 1 to 5, from 5 to 10, from 10 to 15, from 15 to 20, from 20 to 25, from 25 to 30, 30 to 35, from 35 to 40, from 40 to 45, from 45 to 50, from 50 to 55, from 55 to 60 atom % or a range comprising two or more of these ranges, relative to the entire composition;

n is atomic percent in a range from 0.1 to 0.5, from 0.5 to 1, from 1 to 1.5, from 1.5 to 2, from 2 to 2.5, from 2.5 to 3, from 3 to 3.5, from 3.5 to 4, from 4 to 4.5, from 4.5 to 5, from 5 to 5.5, from 5.5 to 6, from 6 to 6.5, from 6.5 to 7, from 7 to 7.5, from 7.5 to 8 from 8.5 to 9, from 9 to 9.5, from 9.5 to 10, from 10 to 12, from 12 to 14, from 14 to 16, from 16 to 18, from 18 to 20 atom %, or a range comprising two or more of these ranges, relative to the entire composition;

p is atomic percent in a range from 1 to 2, from 2 to 3, from 3 to 4, from 4 to 5, from 5 to 6, from 6 to 7, from to 8, from 8 to 9, from 9 to 10, from 10 to 11, from 11 to 12, from 12 to 13, from 13 to 14, from 14 to 15, from 15 to 16, from 16 to 17, from 17 to 18, from 18 to 19, from 19 to 20 atom % or a range comprising two or more of these ranges, relative to the entire composition, and j, k, m, n, and p are independently variable within their stated ranges provided that the sum of j+k+m+n+p is greater than 95, 98, 99, 99.5, 99.8, or 99.9 atom % to about 99.9 atom % or 100 atom %.

In some specific embodiments of this $Nd_jDy_kCo_mCu_nFe_p$ is represented by the broadest genus of $Nd_{5-15}Dy_{20-60}Co_{10-30}Cu_{2-8}Fe_{2-20}$, subject to the sub-embodiments described in the immediately preceding paragraphs. In still other embodiments within this group, up to 50 at % of the Dy may be substituted with Tb. In other embodiments within this group, some or all of the Nd may be substituted with Pr In still other embodiments, the chemical composition of the alloy is substantially represented by the formula $Nd_{10-14}Fe_{1-5}Dy_{55-65}Tb_{0.01-0.5}Al_{0.01-1.5}Co_{15-25}Pr_{0.01-0.5}Ga_{0.01-0.2}Co_{0.01-0.3}O_{0.001-0.1}$ atom %. In certain independent aspects of these embodiments, the contents of Nd, Fe, Dy, Tb, Al, Cu, Co, Pr, and Ga are independently provided as:

Nd, is a range comprising one or more ranges including those from 10 to 14 atom % in increments of 0.05 atom %, also including one or more ranges including those from 10 to 10.1, from 10.1 to 10.2, from 10.2 to 10.3, from 10.3 to 10.4, from 10.4 to 10.5, from 10.5 to 10.6, from 10.6 to 10.7, from 10.7 to 10.8, from 10.8 to 10.9, from 10.9 to 11.0, from 11 to 11.1, from 11.1 to 11.2, from 11.2 to 11.3, from 10.3 to 11.4, from 11.4 to 11.5, from 11.5 to 11.6, from 11.6 to 11.7, from 11.7 to 11.8, from 11.8 to 11.9, from 11.9 to 12.0, from 12 to 12.1, from 12.1 to 12.2, from 12.2 to 12.3, from 12.3 to 12.4, from 12.4 to 12.5, from 12.5 to 12.6, from 12.6 to 12.7, from 12.7 to 12.8, from 12.8 to 12.9, from 12.9 to 13.0, from 13 to 13.1, from 13.1 to 13.2, from 13.2 to 13.3, from 13.3 to 13.4, from 13.4 to 13.5, from 13.5 to 13.6, from 13.6 to 13.7, from 13.7 to 13.8, from 13.8 to 13.9, and from 13.9 to 14 atom %;

Fe, is a range comprising one or more ranges including those from 1 to 5 atom % in increments of 0.05 atom %, also including one or more ranges including those from 1 to 1.1, from 1.1 to 1.2, from 1.2 to 1.3, from 1.3 to 1.4, from 1.4 to 1.5, from 1.5 to 1.6, from 1.6 to 1.7, from 10.7 to 1.8, from 1.8 to 1.9, from 1.9 to 2.0, from 2 to 2.1, from 2.1 to 2.2, from 2.2 to 2.3 from 2.3 to 2.4, from 2.4 to 2.5, from 2.5 to 2.6, from 2.6 to 2.7, from 2.7 to 2.8, from 2.9, to 3.0, from 3 to 3.1, from 3.1 to 3.2, from 3.2 to 3.3, from 3.3 to 3.4, from 3.4 to 3.5, from 3.5 to 3.6, from 3.6 to 3.7, from 3.7 to 3.8, from 3.8 to 3.9, from 3.9 to 4.0, from 4 to 4.1, from 4.1 to 4.2, from 4.2 to 4.3, from 4.3 to 4.4, from 4.4 to 4.5, from 4.5 to 4.6, from 4.6 to 4.7, from 4.7 to 4.8, from 4.8 from 4.9 to 5 atom %;

Dy, is a range comprising one or more ranges including those from 55 to 65 atom % in increments of 0.05 atom %, also including one or more ranges including those from 55 to 55.2, from 55.2 to 55.4, from 55.4 to 55.6, from 55.6 to 55.8, from 55.8 to 56.0, 56 to 56.2, from 56.2 to 56.4, from 56.4 to 56.6, from 56.6 to 56.8, from 56.8 to 57.0, from 57 to 57.2, from 57.2 to 57.4, from 57.4 to 57.6, from 57.0 to 57.8, from 57.8 to 58.0, from 58.2 to 58.4, from 58.4 to 58.6, from 58.6 to 58.8. from 58.8 to 59.0, from 59 to 59.2, from 59.2 to 59.4, from 59.4 to 59.6, from 59.6 to 59.8, from 59.8 to 60.0, from 60 to 60.2, from 60.2 to 60.4, from 60.4 to 60.6, from 60.6 to 60.8, from 60.8 to 62.0, from 62 to 62.2, from 62.2 to 62.4, from 62.4 to 62.6, from 62.6 to 62.8, from 62.8 to 63.0, from 63 to 63.2, from 63.2 to 63.4, from 63.4 to 63.6, from 63.6 to 63.8, from 63.8 to 64.0, from 64 to 64.2, from 61.2 to 64.4, from 64.4 to 64.6, from 64.6 to 64.8, from 64.8 to 65.0 atom %;

Tb, is a range comprising one or more ranges including those from 0.01, to 0.5 atom % in increments of 0.5 atom %, also including one or more ranges including those from 0.01 to 0.05, from 0.05 to 0.1, from 0.15, from 0.15 to 0.2, from 0.2 to 0.25, from 0.25 to 0.3, from 0.3 to 0.35, from 0.35 to 0.4, from 0.4 to 0.45, from 0.45 to 0.5 atom %;

Al, is a range comprising one or more ranges including those from 0.01 to 1.5 atom % in increments of 0.05 atom %, also including one or more ranges including those from 0.01 to 0.05, from 0.05 to 0.1, from 0.1 to 0.15, from 0.15 to 0.2, from 0.2 to 0.25, from 0.25 to 0.3, from 0.3 to 0.35, from 0.35 to 0.4, from 0.4 to 0.45, from 0.45 to 0.5, 0.6 to 0.65, from 0.65 to 0.7, from 0.7 to 0.75, from 0.75 to 0.8, from 0.8 to 0.85, from 0.85 to 0.9, from 0.8 to 0.95, from 0.95 to 1, from 1 to 1.05, from 1.05 to 1.1, 1.1 to 1.15, from 1.15 to 1.2, from 1.2 to 1.25, from 1.25 to 1.3, from 1.3 to 1.35, from 1.35 to 1.4, from 1.4 to 1.45, from 1.45 to 1.5 atom %;

Cu, is a range comprising one or more ranges including those from 1 to 5 atom % in increments of 0.05 atom %, also including one or more ranges including those from 1 to 1.1, from 1.1 to 1.2, from 1.2 to 1.3, from 1.3 to 1.4, from 1.4 to 1.5, from 1.5 to 1.6, from 1.6 to 1.7, from 10.7 to 1.8, from 1.8 to 1.9, from 1.9 to 2.0, from 2 to 2.1, from 2.1 to 2.2, from 2.2 to 2.3, from to 2.4, from 2.4 to 2.5, from 2.5 to 2.6, from 2.6 to 2.7, from 2.7 to 2.8, from 2.8 to 2.9, from 2.9 to 3.0, from 3 to 3.1, from 3.1 to 3.2, from 3.2 to 3.3, from 3.3 to 3.4, from 3.4 to 3.5, from 3.5 to 3.6, from 3.6 to 3.7, from 3.7 to 3.8, from 3.8 to 3.9, from 3.9 to 4.0, from 4 to 4.1, from 4.1 to 4.2, from 4.2 to 4.3, from 4.3 to 4.4, from 4.4 to 4.5, from 4.5 to 4.6, from 4.6 to 7, from 4.7 to 4.8, from 4.8 to 4.9, from 4.9 to 5 atom %;

Co, is a range comprising one or more ranges including those from 15 to 25 atom % in increments of 0.05 atom %, also including one or more ranges including those from 15 to 15.2, from 15.2 to 15.4, from 15.4 to 15.6, from 15.6 to 15.8, from 15.8 to 16.0, 16 to 56.2, from 16.2 to 16.4, from 16.4 to 16.6, from 16.6 to 16.8, from 16.8 to 17.0, from 17 to 17.2, from 17.2 to 17.4, from 17.4 to 17.6, from 17.6 to 17.8, from 17.8 to 18.0, from 18 to 18.2, from 18.2 to 18.4, from 18.4 to 18.6, from 18.6 to 18.8, from 18.8 to 19.0, from 19 to 19.2, from 19.2 to 19.4, from 19.4 to 19.6, from 19.6 to 19.8, from 19.8 to 20.0, from 20 to 20.2, from 20.2 to 20.4, from 20.4 to 20.6, from 20.6 to 20.8, from 20.8 to 22.0, from 22 to 22.2, from 22.2 to 22.4, from 22.4 to 22.6, from 22.6 to 62.8, from 22.8 to 23.0, from 23 to 23.2, from 23.2 to 23.4, from 23.4 to 63.6, from 63.6 to 23.8, from 63.8 to 24.0, from 24 to 24.2, from 24.2 to 24.4, from 24.4 to 24.6, from 64.6 to 24.8, from 24.8 to 25.0 atom %;

Pr, is a range comprising one or more ranges including those from 0.01 to 0.5 atom % in increments of 0.05 atom %, also including one or more ranges including those from 0.01 to 0.05, from 0.05 to 0.1, from 0.1 to 0.15, from 0.15 to 0.2, from 0.2 to 0.25, from0.25 to 0.3, from 0.3 to 0.35, from 0.35 to 0.4, from 0.4 to 0.45, from 0.45 to 0.5 atom %;

Ga, is a range comprising one or more ranges including those from 0.01 to 0.2 atom % in increments of 0.05 atom %, also including one or more ranges including those from 0.01 to 0.05, from 0.05 to 0.1, from 0.1 to 0.15, from 0.15 to 0.2 atom %;

In certain other independent embodiments, the alloy is substantially represented by the formula $(Nd_{0.01\text{-}0.18}Pr_{0.01\text{-}0.18}Dy_{03\text{-}0.5}Tb_{0.3\text{-}0.5})_{aa}$ $(Co_{0.85\text{-}0.95}Cu_{0.04\text{-}0.15}Fe_{0.01\text{-}0.08})_{bb}$ $(Zr_{0.00\text{-}1.00})_{cc}$; wherein:

aa is a value in a range of from 42 atom % to 75 atom %;

bb is a value in a range of from 6 atom % to 60 atom %; and cc is a value in a range of from 0.01 atom % to 18 atom;

provided the combined amount of Nd+Pr is greater than 12 atom %;

provided the combined amounts of Nd+Pr+Dy+Tb is greater than at least one of 95, 98, 99, 99.5, 99.8, or 99.9 atom % to about 99.9 or 100 atom %;

provided the combined amounts of Co+Cu+Fe is greater than 95, 98, 99, 99.5, 99.8, or 99.9 atom % to about 99.9 or 100 atom %; and provided aa+bb+cc is greater than 0.995 to about 0.999 or 1.

In still other independent embodiments the alloy is described by a stoichiometric formula of $(Nd_{0.16}Pr_{0.05}Dy_{0.392}Tb_{0.40})_{aa}$ $(Co_{0.86}Cu_{0.12}Fe_{0.02})_{bb}$ $(Zr_{1.00})_{cc}$, the individual variances of any of the parenthetical values independently being ±0.01, ±0.02, ±0.04, ±0.06±0.0.8, or ±0.1.

In certain other independent aspects of these embodiments, the compositions comprise: $Nd_{12.95}Fe_{2.21}Dy_{59.27}Tb_{0.24}Al_{0.86}Cu_{3.28}Co_{20.69}Pr_{0.33}Ga_{0.19}C_{0.01}O_{0.17}$, $Nd_{13.44}Fe_{1.88}Dy_{61.54}Tb_{0.25}Al_{0.06}Cu_{3.12}Co_{19.279}Pr_{0.07}Ga_{0.19}C_{0.01}O_{0.17}$, $Nd_{13.95}Fe_{2.21}Dy_{59.27}Tb_{0.24}Al_{0.86}Cu_{3.28}Co_{20.69}Pr_{0.13}Ga_{0.095}Zr_{0.095}C_{0.01}O_{0.07}$, $Nd_{13.95}Fe_{2.21}Dy_{60.07}Tb_{0.24}Al_{0.06}Cu_{3.28}Co_{20.69}Pr_{0.13}Mo_{0.06}Ga_{0.095}Zr_{0.095}C_{0.01}O_{0.01}$, or $Nd_{13.95}Fe_{2.21}Dy_{60.07}Tb_{0.24}Al_{0.06}Cu_{3.28}Co_{20.69}Pr_{0.15}Mo_{0.06}Ga_{0.095}Zr_{0.093}C_{0.001}O_{0.001}$ atom %, wherein in independent embodiments, each elemental proportion independently varies by 10%, 7%, 5%, 4%, 3%, 2%, or less, relative to the listed value (e.g., a 5% variance of $Nd_{12.95}$ provides a range of $Nd_{12.03\text{-}13.60}$).

In still other embodiments, the chemical composition of the alloy is or comprises at least one phase substantially represented by one or more of the following formula:

(i) $Dy_2Fe_{14}B$,
(ii) $Pr_2Co_{14}B$,
(iii) $Pr_2Fe_{14}B$,
(iv) Nd metal (greater than 99 wt % Nd),
(v) Nd-oxide,
(vi) Nd-oxifluoride,
(vii) $NbB_2$,
(viii) $Nd_2Co_{14}B$,
(ix) NbFeB,
(x) $Nd_2Ni_{14}B$,
(xi) Pr-oxide,
(xii) $Pr_2Ni_{14}B$,
(xiii) $Tb_2Co_{14}B$,
(xiv) $Tb_2Fe_{14}B$,
(xv) $Tb_2Ni_{14}B$,
(xvi) $CoNd_3$,
(xvii) GaNd,
(xviii) $NiNd_3$,
(xix) $Y_2O_3$,
(xx) Gd,
(xxi) SS316L (or any other grade of stainless steel),
(xxii) or a combination of two or more of these materials.

The compositions of the present disclosure also have extremely low levels of carbon and oxygen impurities, owing to the methods used and specific controls defined in their making. In certain of these embodiments, the substantially spherical particles of these disclosed compositions have a carbon content in a range of from 0 to 800 ppm, an oxygen content in a range of from 0 to 900 ppm, and/or a combined carbon and oxygen content in a range of from 0 to 1700 ppm by weight relative to the entire weight of the particle. In such cases, the carbon or oxygen "by weight relative to the entire weight the particle" may be defined as the mean value for the carbon and oxygen content per particle, as determined from a plurality of particles In certain of these embodiments, the substantially spherical particles have a mean carbon content in a range of from 0 to 800 ppm by weight relative to the entire weight of the particle as determined by a LECO CS844 Carbon and Sulfur determinator. In this method, a sample is retrieved directly from the sample chamber, the probe being immersed in the melt where the sample chamber in the probe fills by aspiration, followed by powder compaction and combustion technique to measure the carbon content. In certain embodiments, the carbon content is in a range defined by one or more of the range of from 0 to 40, from 40 to 80, from 80 to 120, from 120 to 160, from 160 to 200, from 200 to 240, from 240 to 280, from 280 to 320, from 320 to 360, from 360 to 400, from 400 to 440, from 440 to 480, from 480 to 520, from 520 to 560, from 560 to 600, from 600 to 640, from 640 to 680, from 680 to 720, from 720 to 760, from 760 to 800 ppm, from 800 to 900, from 900 to 1000, from 1000 to 1100, from 1100 to 1200, from 1200 to 1300, and or from 1300 to 1400 ppm by weight relative to the entire weight of the particle.

In certain of these embodiments, the substantially spherical particles have a mean oxygen content in a range of from 0 to 900 ppm by weight relative to the entire weight of the particle as determined by Leco ONH836 CS744 element analyzers. In certain of these embodiments, the oxygen content is in a range defined by one or more of the range of from 0 to 40, from 40 to 80, from 80 to 120, from 120 to 160, from 160 to 200, from 200 to 240, from 240 to 280, from 280 to 320, from 320 to 360, from 360 to 400, from 400 to 440, from 440 to 480, from 480 to 520, from 520 to 560, from 560 to 600, from 600 to 640, from 640 to 680, from 680 to 720, from 720 to 760, from 760 to 800, and/or from 800 to 900 ppm by weight relative to the entire weight of the particle.

In certain of these embodiments, the substantially spherical particles have a combined carbon and oxygen content is in a range defined by one or more of the range of from 0 to 40, from 40 to 80, from 80 to 120, from 120 to 160, from 160 to 200, from 200 to 300, from 300 to 400, from 400 to 500, from 500 to 600, from 600 to 700, from 700 to 800, from 800 to 900, from 900 to 1000, from 1000 to 1100, from 1100 to 1200, from 1200 to 1300, from 1300 to 1400, from 1400 to 1500, from 1500 to 1600, and/or from 1600 to 1700 ppm by weight relative to the entire weight of the particle.

In some embodiments, sub micron particles are processed with larger particles. In some cases, the sub-micron particles may be compositions useful as grain boundary additives in the preparation of NdFeB magnetic materials, such grain boundary materials may include elevated levels of Dy and/or Tb, Cu, and Co, relative to the standard NdFeB magnetic materials. Such grain boundary materials include those, described elsewhere herein and represented as $Nd_{1-20}Dy_{1-60}Co_{1-60}Cu_{0.1-20}Fe_{0.5-90}$ at. % or $Nd_{1-14}Dy_{30-50}Co_{25-15}Cu_{1-10}Fe_{1-10}$ at. % or $Nd_{8.5-12.5}Dy_{35-45}Co_{32-41}Cu_{3-6.5}Fe_{1.5-5}$ atom % or by the formula: $AC_bR_xCo_yCu_dM_z$, where (A) AC comprises Nd and Pr in an atomic ratio in a range of from 0:100 to 100:0, and b is a value in a range of from about 5 atom % to about 65 atom %;

(B) R is one or more rare earth element including one or both of Tb and Dy and x is a value in a value in a range of from about 5 atom % to about 75 atom %;

(C) Co is cobalt and Cu is copper;

(D) y is a value in a range of from about 20 atom % to about 60 atom %;

(E) d is a value in a range of from about 0.01 atom % to about 12 atom %;

(F) M is at least one transition metal element, exclusive of Cu and Co, and z is a value in a range of from about 0.01 atom % to about 18 atom %; and (G) the sum of b+x+y+d+z is greater than 99 atom %.

Such materials, and the methods of making solidus compositions with $G_2Fe_{14}B$ alloys, where G is a rare earth element, are described in PCT/US2017/014488, which is incorporated by reference herein in its entirety for all purposes, or at least for its teaching related to preparing solidus compositions and the sintered bodies prepared therefrom.

Methods of and Reactors for Making the Compositions

In addition to the compositions themselves, the present disclosure contemplates the methods of making these compositions as well. By maintaining strict control over the thermal and environmental conditions of their processing, powders produced by the disclosed methods are superior to those currently known.

In some embodiments, the particles described herein are prepared in equipment which described in one or more embodiments in in the co-pending U.S. Patent Application PCT/US17/47103, filed the same date as this application, and titled "Caster Assembly." The content of this co-pending application is incorporated by reference herein, in its entirety for all purposes, or at least for the descriptions of the conditions and equipment configurations used to prepare such particles.

Certain embodiments include methods comprising subjecting a stream of a molten or liquid metal or metallic alloy to impingement by one or more oblique streams (e.g., jet or spray) of one or more inert fluids, under conditions that produce a dispersion of substantially spherical solid particles of the metallic alloy within the inert fluid stream. The molten or liquid metal or metallic alloy and the one or more oblique streams of inert fluid(s) may be introduced to one another by any suitable spray means or nozzle. The molten/liquid metallic alloy may be introduced to the inert fluid stream(s) in a hot zone of a tangential reactor, where the hot zone may be maintained at a temperature controlled to within ±10° C. variance or within ±5% of a set temperature. Once formed, the substantially spherical solid particles of the metal or metallic alloy are separated from the inert fluid stream by gravity/filtration.

One embodiment of an apparatus useful for forming these particles is disclosed in FIG. 1, which represents a side view of a powder generating assembly. While helpful in describing some of the conditions and features used to develop these particles, this depiction is not intended to limit other features or descriptions provided herein and other variations of this illustration are obvious to those skilled in the art. The description of these methods and the apparatuses themselves are considered within the scope of this disclosure.

For example, as illustrated in FIG. 1, the powder generating apparatus may contain a head assembly 11 mounted above a reactor assembly 14, the reactor assembly being optionally frustum shaped to facilitate collection of the produced powders in a collection assembly (not shown). The head assembly 11 contains the molten or liquid metal or metal alloy, and optionally contains heating elements, for example resistive heating elements so as to maintain the molten or liquid metal or metal alloy at a constant temperature. The head assembly 11 may be conveniently comprise a conically shaped reservoir for the molten or liquid metal or metal alloy, with an exit hole or nozzle 16 which allows the molten or liquid metal or metal alloy to be directed to the collection assembly. Typically, the rate at which the molten or liquid metal or metal alloy passes through nozzle 16 depends on its weight/density, the nozzle diameter, and a pressure differential $\Delta P = P_1 - P_2$ which is applied/maintained across the assembly (a gasketed portal 17 provides the barrier to maintain the pressure differential). Actually, the pressure in the vortex, for example at 15 or adjacent to 16 in FIG. 1, is expected to be slightly less than even the pressure $P_2$, as it is upstream of the pressures being delivered by the feed nozzles. This pressure differential $\Delta P = P_1 - P_2$ may be on the order of 200 to 800 millibar, for example, 400 to 600 millibar. As depicted in FIG. 1, the orientation of the nozzle 16 defines a hypothetical center axis 18, that may be at any angle with respect to the collection assembly, though is preferably this hypothetical center axis coincides with a hypothetical center axis of the collection assembly.

As described elsewhere, nano- and microscale powders may be prepared by impinging the molten or liquid metal or metal alloy feed with one or more inert fluids. FIG. 1 depicts such exemplary feeds as 10, 12, and 13/13A. Each of these feeds may provide the same or different inert fluids (compositions, phases, velocities, etc.) to the reactor. The specific and relative orientations of each feed may be the same or different as shown here. And while 10, 12, and 13/13A are shown as individual feeds, the reactor may comprise a plurality of each, for example, radially distributed about, the hypothetical axis 18. Still further, while tangential feed 10 is shown as being delivered laterally from the below the head (e.g., upper third of the reactor, as defined by the distance from the to the bottom of the reactor assembly 14), in certain other embodiments, tangential feed 10 may be delivered downward from within the reactor head, laterally from a position closer to the middle (e.g., middle third), or delivered upwardly from closer to the bottom (e.g., bottom third) of the reactor. Likewise, while the obliquely impinging feed 12 is depicted in FIG. 1 as contained within the reactor head, directed to impinge the molten or liquid metal or metal alloy feed at an angle less than 90°, in other embodiments, this impinging feed 12 may be positioned below the nozzle 16 and directed to impinge the incoming molten or liquid metal or metal alloy feed at an angle of 90° or higher. Also, likewise, while feed 13/13A is depicted as oriented substantially parallel to the center line axis 18, in other embodiments, this feed 13/13A may be oriented to have a radial component inward or away from the center line axis 18.

In certain embodiments, the molten or liquid metal or metal alloy feed is directed through nozzle 16, whereupon it is obliquely impinged by an inert fluid stream, for example as represented by feed 12. Tangential fluid stream(s) 10 provides a vortex within the reactors, within which is a hot zone, 15—i.e., the temperature at the center of the reactor is hotter than at the sides, the temperature at the sides of the reactor more closely reflecting the temperature of the incoming feed stream 10. As depicted in FIG. 1 fluid feed(s) 13/13A provide(s) additional mixing within the body of the reactor and helps direct to particles to exit the reactor.

The energy delivered by oblique impingement disperses the molten or liquid metal or metal alloy into the nano- or micro-scale particles. While dispersing the molten or liquid metal or metal alloy into the nano- or micro-scale particles, the impinging inert fluid imparts a radial component to the direction of the particles, directing them away from the center line axis and into the vortex generated by the tangential feed(s) 10. The specific size of the particles can be controlled, for example, by controlling the parameters associated with this impingement, including, but not necessarily limited to the angle of the oblique impingement, the velocity and mass flow of the inert fluid (controlled by the head pressures and nozzle shapes of the associated fluid streams), and the physical nature (heat capacity, temperature, and density) of the inert fluid.

The velocity, angle, and density of the impinging fluid(s) define the energy applied to dispersing the molten or liquid metal or metal alloy into the nano- or micro-scale particles which, in turn, affect the size of the initially formed particles and the time spent solidifying within the hot zone 15 of the vortex reactor. While the angle of impingement may be any angle from greater than zero degrees to less than 180 degrees, in preferred embodiments, the oblique angle is in a range of 10° to less than 90°, preferable in a range of from about 30° to about 60°. In most cases, this allows for the use of a useful range of velocities while maintaining useful particle longevity in the hot zone of the vortex. Useful head pressures for controlling the fluid velocities range from 10 to 100 bar gauge. The degree of spray helps define the size and speed of the injected metal or metallic alloys, and in preferred embodiments, the degree of spray is between 20 to 90 degrees. Such spray patterns may be achieved, for example, using a de Laval, conical, bell-shaped, contoured bell shape shortened, plug/aerospike, or expansion-deflection type of nozzle.

As used herein, the term “inert fluid stream” refers to stream of non-oxidizing fluids, or fluids which are substantially free of oxidizing species and which do not otherwise react with metals of the molten alloy under the injection conditions. In certain embodiments, the inert fluid comprises nitrogen, argon, helium, hydrogen, or a mixture thereof. These fluids may be used as blends or individually, such that in some embodiments, the fluid consists of nitrogen, argon, helium, or hydrogen. In other embodiments, the fluid temperature is in a range of from minus 240° C. to Tt ° C., where the Tt is a temperature that is at least 100° C. lower than the melting temperature of the metal or metal alloy sample. In certain embodiments, the fluid is a liquid. For example, the fluid may comprise nitrogen at 77 K at atmospheric pressure, argon at 87 K at atmospheric pressure, helium at 4 K at atmospheric pressure, or hydrogen at 20.2 K at atmospheric pressure. In other embodiments, the fluid is a gas. It may be especially helpful if the feed 12 comprises a gas, including a preheated gas. The higher accessible temperatures provides additional time for the energy transfer of the impinging fluid to the molten or liquid metal or metal alloy before the metal or metal alloy solidifies, thereby allowing for the formation of smaller powders. In reference to FIG. 1, the temperature of the incoming feed gas 12 may be varied by varying the temperature of the gas in its storage reservoir (not shown) or with in-line heaters and by varying the distance 19 between the molten metal reservoir and the feed channel itself.

In independent embodiments, the processing conditions are defined to provide that the injected liquid metal or metallic alloy is cooled at a rate of $10^3$ K/sec, $10^4$ K/sec, $10^5$ K/sec, $10^6$ K/sec, or higher, or by a rate in a range bounded by two or more of these values. Again, such rates can be derived by adjusting the flow velocities of the metals/alloys and/or inert fluids and the nature, temperature, and relative amounts (with respect to the metals/alloys) of the inert fluids. In some embodiments, the inert fluid stream has a velocity of 0.2-10.5 km/sec. By adjusting the rate of injection and the cooling rate of the sprayed products, it is possible to define the particle size and shape with high precision (see, e.g., Table 2). For example, by controlling the cooling rate of the sprayed or dispersed materials (as defined by the velocity and heat capacities of the fluids into which the metals are injected), it is possible to control the particle sizes to provide a mean particle size in a range of 80 nm to 500 microns, with little or no variation in the composition of the particles. See, e.g., Table 3).

So as to maintain the extremely low levels of carbon and oxygen impurities, it is important that the powder processing be conducted under conditions where the ambient presence of these impurities is low. For example, ambient oxygen levels should be maintained below one ppm in the processing chamber. In preferred embodiments, all of the operations (e.g., through sintering or compounding into bonded magnets) are performed in a single, inert atmosphere chamber, to minimize exposure of even the solid powders to oxidizing environments.

In other embodiments, the methods comprise spraying the molten or liquid metal or metal alloy directly into the inert fluid stream (not shown in FIG. 1). The degree of spray helps define the size and speed of the injected metal or metallic alloys, and in preferred embodiments, the degree of spray is between 20 to 90 degrees. Such spray patterns may be achieved, for example, by varying the distance between 16 and any of the inert liquid stream portals using a de Laval, conical, bell-shaped, contoured bell shape shortened, plug/aerospike, or expansion-deflection type of nozzle. In other embodiments, an oblique fluid feed may be directed to impinge on the sprayed molten or liquid metal or metal alloy, thereby further dispersing the sprayed particles.

Whether the molten or liquid metal or metal alloys are sprayed into the inert liquid or the inert fluid impinges a stream of the molten or liquid metal or metal alloy (or a combination of the two of these methods), careful control of the temperature is required during formation of the powder particles. It is convenient, then, to control this temperature using tangential reactors (again, as illustrated by the use of feed 10 in FIG. 1). In particular, whether the particles are formed by injecting or spraying of the molten/liquid metallic alloy into the inert fluid stream, this process occurs in a hot zone of such a tangential reactor. So as to maintain optimal control of the particle sizes, the spray and tangential fluid flows within the reactors are controlled such that this hot zone is maintained at a temperature within ±10° C. variance or within ±5% of a set temperature. The specific temperature depends on the particular metal or metallic alloy being used, and the person of skill in the art would be able to define this temperature for a given material and desired particle size without undue experimentation. Once formed, the substantially spherical solid particles of the metallic alloy may be separated from the inert fluid stream by gravity/filtration (FIG. 1).

By maintaining the controls as described, it is possible to achieve the particle size distributions, chemical homogeneity, and impurity levels as otherwise described herein.

Sintered Bodies, Including Sintered Magnets

Sintered bodies may be prepared using one or more particle compositions described herein using methods as described in PCT/US2017/014488, which is incorporated by reference for all purposes, but at least for these methods. In some embodiments, one or more particle populations are mixed and heated to a temperature greater than the solidus temperature of a first metal or metallic alloy but less than the melting temperature of a second metal or metallic alloy to form a population of discrete mixed alloy particles. These particles or mixed alloy particles may be compressed together to form a green body, under a magnetic field of a suitable strength to align the magnetic particles with a common direction of magnetization in an inert atmosphere. Such compression may be done under a force in a range of from about 800 to about 3000 kN. The magnetic field may be applied in a range of from about 0.2 T to about 2.5 T. The green body may be further heated at one or more temperature at an appropriate temperature to sinter the green body, optionally again in the presence of a magnetic field, at a temperature appropriate for the specific materials. In some embodiments, this is in a range of from about 800° C. to about 1500° C. for a time sufficient to sinter the green body into a sintered body comprising sintered core shell particles held together by a grain boundary composition. This sintered body may further be treated in an environment of cycling vacuum and inert gas at a temperature in the range of from about 450° C. to about 600° C.

Bonded Magnets

Another application in which the powders of the instant application may find use, and demonstrate their superior properties is in the field of bonded magnets. In their most basic form, bonded magnets may be seen as a polymer composite, comprising a hard magnetic powder and a non-magnetic polymer or rubber binder. The binder that holds the magnetic particles in place can produce either a flexible or rigid magnet. In the former case, in certain embodiments, flexible bonded magnets typically use nitrile rubber and vinyl as binders, whereas rigid bonded magnets use nylon, PPS, polyester, PTFE and thermoset epoxies as binders. As may be expected, bonded magnets may be processed by any means use to prepare filled polymer composites, for example, calendering, injection molding, extrusion and compression bonding. The specific process conditions used for any of these operations depends on the nature of the polymer used, and the intended shape and use of the final process, but these processes are readily understood by those skilled in the art of polymer composite processing.

Such processes allow the formation of large, thin sheets of materials (e.g., through calendering or extrusion), with typical sheet thicknesses on the order of from 0.25 to 10 mm, or complex shaped, formed magnets (e.g., by injection molding or compression bonding). Magnetic powder loadings can range from about 1 vol % to about 5 vol %, from about 5 vol % to about 10 vol %, from about 10 vol % to about 15 vol %, from about 15 vol % to about 20 vol %, from about 20 vol % to about 25 vol %, from about 25 vol % to about 30 vol %, from about 30 vol % to about 35 vol %, from about 35 vol % to about 40 vol %, from about 40 vol % to about 45 vol %, from about 45 vol % to about 50 vol %, from about 50 vol % to about 55 vol %, from about 55 vol % to about 60 vol %, from about 60 vol % to about 65 vol %, from about 65 vol % to about 70 vol %, from about 70 vol % to about 75 vol %, from about 75 vol % to about 80 vol %, from about 80 vol % to about 85 vol %, or any combination of two or more of these ranges, depending on the method. Compression bonding can produce higher filled bonded magnets (e.g., up to 85 vol %) than injection molding (e.g., up to about 65 vol %).

The advantages of bonded magnets, even over sintered magnets, include the ability to process them into near net shape, with high dimensional tolerances and requiring little if any finishing operations, compared to powder or cast metallurgical processes. Another advantage of isotropic magnetic powders, including NdFeB powders, is that no aligning field is required during forming process, simplifying fabrication. In certain independent embodiments of the present invention, the bonded magnets are magnetized during or after being formed into shape.

The present invention includes those embodiments where any one or more of the powders described herein are incorporated into such composites, either as non-magnetized or magnetized bonded magnets. In specific embodiments, these powders comprise rare earth elements, including any such material described herein, and in more specific individual embodiments, these powders comprise Alnico, SmCo, ferrite, and/or neodymium (NdFeB) magnetic materials. In subset embodiments, these magnetic materials are present having mean particles sizes less than about 3 microns, less than 1 micron, less than 500 nm, less than 250 nm, or less than 100 nm. The present invention also includes those embodiments in which these bonded magnets are incorporated, for example, motors, dipole magnets, sensors, magnetic torque and linear couplers, and Halbach arrays, as well as any product incorporating these motors and sensors, for example, hard disk drives, optical disk drive motors and fax, copier and printer stepper motors, personal video recorders and mp3 music players, instrument panel motors, seat motors and air bag sensors, and fans.

The present invention may be understood more readily by reference to the preceding descriptions taken in connection with the accompanying Figures and Examples, all of which form a part of this disclosure. It is to be understood that this invention is not limited to the specific products, methods, conditions or parameters described or shown herein, and that the terminology used herein is for the purpose of describing particular embodiments by way of example only and is not intended to be limiting of any claimed invention. Similarly, unless specifically otherwise stated, any description as to a possible mechanism mode, or theory of action reason for improvement is meant to be illustrative only, and the invention herein is not to be constrained by the correctness or incorrectness of any such suggested mechanism, mode, or theory of action or reason for improvement. Throughout this text, it is recognized that the descriptions refer to compositions and methods of making and using said compositions. That is, where the disclosure describes or claims a feature or embodiment associated with a composition or a method of making or using a composition, it is appreciated that such a description or claim in one context is intended to extend these features or embodiment to embodiments in every other of these contexts (i.e., compositions, methods of making, and methods of using).

In the present disclosure the singular forms “a,” “an,” and “the” include the plural reference, and reference to a particular numerical value includes at least that particular value, unless the context clearly indicates otherwise. Thus, for example, a reference to “a material” is a reference to at least one of such materials and equivalents thereof known to those skilled in the art, and so forth.

When a value is expressed as an approximation by use of the descriptor “about,” it will be understood that the particular value forms another embodiment. In general, use of the term “about” indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining, the extent of the word “about.” In other cases, the gradations used in a series of values may be used to determine the intended range available to the term “about” for each value. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others. For example, in the method steps (a) through (f) described herein, each of steps (a), (b), (c), (d), (e), (f), and any combination of two or more of these steps are considered separate embodiments of this disclosure.

Any theory or means of action is intended to be illustrative of concepts or help visualize certain aspects of the invention(s) only and cannot necessarily be known to occur with any particular certainty. So, while used to help with understanding, it is to be appreciated, that the invention(s) does not necessarily depend on the correctness of any particular theory of operability described herein.

The transitional terms “comprising,” “consisting essentially of,” and “consisting” are intended to connote their generally in accepted meanings in the patent vernacular; that is, (i) “comprising,” which is synonymous with “including,” “containing,” or “characterized by,” is inclusive or open-ended and does not exclude additional, unrecited elements or method steps; (ii) “consisting of” excludes any element, step, or ingredient not specified in the claim; and (iii) “consisting essentially of” limits the scope of a claim to the specified materials or steps “and those that do not materially affect the basic and novel characteristic(s)” of the claimed invention. Embodiments described in terms of the phrase “comprising” (or its equivalents), also provide, as embodiments, those which are independently described in terms of “consisting of” and “consisting essentially of.” For those embodiments provided in terms of “consisting essentially of,” the basic and novel characteristic(s) is the ability to prepare the inventive substantially spherical powders or particles of the referenced compositions using or comprising the materials described in those embodiments, yet allowing for the optional presence of unavoidable impurities or the presence of other additives that have little or no additional effect on dimensions, compositions, or properties of the resulting materials.

When a list is presented, unless stated otherwise, it is to be understood that each individual element of that list, and every combination of that list, is a separate embodiment. For example, a list of embodiments presented as “A, B, C” is to be interpreted as including the embodiments, “A,” “B,” “C,” “A or B,” “A or C,” “B or C,” or “A, B, or C.” Additionally, where a broad genus (or list of elements within that genus) is described, it is to be understood that separate embodiments also provide for the specific exclusion of one or more elements of that genus. For example, the reference to the genus “rare earth elements” not only includes any individual or combination of two or more elements within that genus (including, e.g., La, Ce, Pr, Nd, Pm, Sm, Eu, Gd, Tb, Dy, Ho, Er, Tm, Yb, and Lu), but also includes, as specific embodiments, the general genus exclusive of one or more of the elements of that genus (e.g., Sm), even if each member of the genus is not specifically recited as excluded.

Throughout this specification, words are to be afforded their normal meaning, as would be understood by those skilled in the relevant art. However, so as to avoid misunderstanding, the meanings of certain terms will be specifically defined or clarified.

As used herein, the term “NdFeB” refers to a composition comprising neodymium, iron, and boron, at least a portion of this being of the stoichiometry $Nd_2Fe_{14}B$.

As used herein, the term “homogenizing” refers to a process of mixing under conditions suitable for preparing a uniform distribution of particles, resulting in a composition that is “substantially homogeneous.” A resulting composition may be considered “substantially compositionally homogeneous,” if at least three samples are taken and tested, for example by ICP, and the results of the three analyses are within some predetermined target precision range (e.g., standard deviation of material measurements less than 5, 3, 2, 1, 0.5, or 0.1%, preferably less than 0.5 or 0.1%, relative to the mean) or within 0.1% to 0.5% of the target value for the component.

The term "substantially represented by the formula" refers to an alloy having a nominal formula X, but allowing for the presence of minor levels of dopants.

The term "substantially spherical," refers to a shape having non-angular edges. To the extent that a given particle or population of particles deviates from a purely spherical shape, such that each particle can be described as having a major and minor axis, the ratio of the lengths of the major and minor axis of each particle can be less than about 2, 1.5, 1.3, 1.2, 1.1, 1.05 or 1.02. As used herein, where the particles are other than purely spherical, the term "mean diameter" refers to the arithmetic average of the lengths of the major and minor axes of the particles Where ranges are provided, it is intended that every integer or tenth or hundredth of an integer, within the range represents an independent endpoint (either minimum or maximum value) in the same range. For example, a range expressed as "from 5 to 10 atom %, 10 to 15 atom %, 15 to 20 atom %, 20 to 25 atom %, 25 to 30 atom %, 30 to 35 atom %, 35 to 40 atom %, 40 to 45 atom %, 45 to 50 atom %, 50 to 55 atom %, 55 to 60 atom %, 60 to 65 atom %, 65 to 70 atom %, 70 to 75 atom %, or any combination of two or more of these ranges" it is intended that other embodiments includes those where the range is also expressed as from 5 to 6, 6 to 7, 7 to 8, 8 to 9, 9 to 10 atom . . . 70 to 71, 71 to 72, 73 to 74, 75 atom %, or any combination of two or more of these ranges"

The term "is greater than at least one of" a series of values (such as "provided the combined amounts of Nd+Pr+Dy+Tb are greater than at least one of 95, 98, 99, 99.5, 99.8, or 99.9 atom %") is intended to connote that each of the series of values are independent embodiments. Further, in cases where a sum of values is described as greater than one or more values (e.g., "greater than at least one of 95, 98, 99, 99.5, 99.8, or 99.9 atom %") it should be apparent that the sum of does not exceed 100 atom %. Further, a description of "greater than at least one of 95, 98, 99, 99.5, 99.8, or 99.9 atom %" also includes separate embodiments where the sum is in a range of from 95 to 98, 98 to 99, 99 to 99.5, 99.5 to 99.8, 99.8 to 99.9, 99.9 to 100 atom %, or any combination of two or more of these ranges. Any nominal difference from 100% may be attributable to accidental impurities or other deliberately added dopants, including from main group elements, such as Al, C, Si, N, O, or P.

Unless otherwise specified, proportions are given in atom % (or mol %). Within a given formula, atom % may also be presented by its decimal equivalent. For example, in the composition $(Nd_{0.01\text{-}0.18}Pr_{0.01\text{-}0.18}Dy_{0.3\text{-}0.5}Tb_{0.3\text{-}0.5})_{aa}$ $(Co_{0.85\text{-}0.95}Cu_{0.04\text{-}0.15}Fe_{0.01\text{-}0.08})_{bb}$ $(Zr_{0.00\text{-}1.00})_{cc}$, the terms $Nd_{0.01\text{-}0.18}$ and $Pr_{0.01\text{-}0.18}$ refer to these elements present in a range of from 1 to 18 atom % and the terms $Dy_{0.3\text{-}0.5}$ and $Tb_{0.3\text{-}0.5}$ refer to these elements present in a range of from 30 to 50 atom %.

As used herein, the term "metallic alloy" refers to a composition comprising at least one rare earth or transition metal element, whether or not the composition may or may not be metallic as a whole.

As used herein, the terms "molten" and "liquid" when referring to a metal or metallic alloy may be seen as essentially interchangeable where both refer to a metal or metallic alloy in a fluid state, suitable for spraying.

"Optional" or "optionally" means that the subsequently described circumstance may or may not occur, so that the description includes instances where the circumstance occurs and instances where it does not.

The terms "particle" and "powder" refer to the same type of solidus material, and for practical purposes be used interchangeably. If a distinction is to be made, the term "powder" tends to refer to a plurality of "particles."

This disclosure refers to chemical compositions, both with respect to compositions within a particle or grain or across a population of particles. In such circumstances, the embodiments describing these compositions implicitly describe the methods used to measure these compositions. For example, where the overall chemical composition of the alloys or particles are described, the embodiment described can be read as that composition having been identified by an appropriate method including, for example, Inductively Coupled Plasma ("ICP").

The following listing of Embodiments is intended to complement, rather than displace or supersede, the previous descriptions. As such, these Embodiments should be read in context or the general, description, and include those additional aspects described above for that Embodiment.

Embodiment 1. A composition comprising a plurality of substantially spherical particles of a metal or metallic alloy, the particles having a mean particle size in a range of 80 nm to 500 microns. In certain Aspects of this Embodiment, each particle of the plurality of particles comprises at least one rare earth element in an amount in a range of from about 0 wt % or 10 wt % to about 99 wt %, relative to the total weight of the particle. Embodied sub-ranges of mean particle size ranges within these ranges include one or more ranges from 80 nm to 100 nm, from 100 nm to 120 nm, from 120 nm to 140 nm, from 140 nm to 160 nm, from 160 nm to 180 nm, from 180 nm to 200 nm, from 200 nm to 300 nm, from 300 nm to 400 nm, from 400 nm to 500 nm, from 500 nm to 600 nm, from 600 nm to 700 nm, from 700 nm to 800 nm, from 800 nm to 900 nm, from 900 nm to 1000 nm, from 1 micron to 2 microns, from 2 microns to 5 microns, from 5 microns to 10 microns, from 10 microns to 50 microns, from 50 microns to 100 microns, from 100 microns to 200 microns, from 200 microns to 300 microns, from 300 microns to 400 microns, from 400 microns to 500 microns. Embodied sub-ranges of the rare earth element amount in a range include one or more ranges from about 10 wt % to 15 wt %, from 15 wt % to 20 wt %, from 20 wt % to 25 wt %, from 25 wt % to 30 wt %, from 30 wt % to 35 wt %, from 35 wt % to 40 wt %, from 40 wt % to 50 wt %, from 50 wt % to 60 wt %, from 60 wt % to 70 wt %, from 70 wt % to 80 wt %, from 80 wt % to 90 wt %, from 90 wt % to 95 wt %, and from 95 wt % to 99 wt %, each relative to the total weight of the particle.

Embodiment 2. The composition of Embodiment 1, wherein the mean particle size is in a range of from about 80 nm to about 500 nm. In additional embodiments, the mean particle size is in a range of from 80 nm to 100 nm, from 100 nm to 120 nm, from 120 nm to 140 nm, from 140 nm to 160 nm, from 160 nm 180, from 180 nm to 200 nm, from 200 nm to 220 nm, from 220 nm to 240 nm, from 240 nm to 260 nm, from 260 nm to 280 nm, from 280 nm to 300 nm, from 300 nm to 320 nm, from 320 nm to 340 nm, from 340 nm to 360 nm, from 360 nm to 380 nm, from 380 nm to 400 nm, from 400 nm to 420 nm, from 420 nm to 440 nm, from 440 nm to 460 nm, from 460 nm to 480 nm, from 480 to 500 nm, or any combination thereof.

Embodiment 3. The composition of Embodiment 1 or 2, wherein the plurality of substantially spherical particles is present in at least one unimodal (or monomodal) distribution. In related sub-embodiments, the at least one unimodal (or monomodal) distribution may be described as a bimodal, trimodal, or polymodal distribution. Each unimodal (or monomodal) distribution may comprise particles of the same or different chemical composition Embodiment 4. The composition of any one of Embodiments 1 to 3, wherein the at least one unimodal (or monomodal) distribution exhibits a size variance in the range of about 2 percent to about 50 percent. In related embodiments, the size variance is in a range of from about 2 percent to about 25 percent, from about 2 percent to about 10 percent, or from about 2 percent to about 5 percent, where size variance is defined as the standard deviation of the particle size distribution divided by the average size of the particles in the particle size distribution.

Embodiment 5. The composition of any one of Embodiments 1 to 3, wherein the unimodal distribution is a Gaussian distribution. In related embodiments, the distribution may be skewed.

Embodiment 6. The composition of any one of Embodiments 1 to 5, wherein the at least one rare earth element is present in an amount in at least one range of from 10 to 15 wt %, from 15 to 20 wt %, from 20 to 25 wt %, from 25 to 10 wt %, from 30 to 35 wt %, from 35 to 40 wt %, from 40 to 45 wt %, from 45 to 50 wt %, from 50 to 55 wt %, from 55 to 60 wt %, from 60 to 65 wt %, from 65 to 70 wt %, from 70 to 75 wt %, from 75 to 80 wt %, from 80 to 85 wt %, from 85 to 90 wt %, from 90 to 95 wt % from 95 to 99 wt %, relative to the total weight of the particle.

Embodiment 7. The composition of any one of Embodiments 1 to 6, wherein the at least one rare earth element comprises Nd, Dy, Pr, Tb, or a combination thereof. More generally, the rare earth element may comprise one or more of the lanthanide and actinide series, for example including La, Ce, Pr, Nd, Pm, Sm, Eu, Gd, Tb, Dy, Ho, Er, Tm, Yb, and Lu.

Embodiment 8. The composition of any one of Embodiments 1 to 7, further comprising at least one transition metal. In specific Aspects of this Embodiment, the at least one transition metal is selected from among the groups 8-12 of the periodic table.

Embodiment 9. The composition of Embodiment 8, wherein the at least one transition metal comprises Ag, Au, Co, Cu, Fe, Ga, Mo, Ni, Ti, V, W, Y, Zn, Zr, or a combination thereof.

Embodiment 10. The composition of any one of Embodiments 1 to 9, wherein the composition is substantially present as $Nd_{1-20}Dy_{1-60}Co_{1-60}Cu_{0.1-20}Fe_{0.5-90}$ at % or $Nd_{1-14}Dy_{30-50}Co_{25-45}Cu_{1-10}Fe_{1-10}$ at. % or $Nd_{8.5-12.5}Dy_{35-45}Co_{32-41}Cu_{3-6.5}Fe_{1.5-5}$ at. %. Certain independent Aspects of this Embodiment include the subclasses and subranges described for this composition elsewhere herein.

Embodiment 11. The composition of any one of Embodiments 1 to 9, wherein the composition comprises one or more of:

(7) an amount of Nd in a range of [6.1717, 11.8917] (at %), inclusive, (8) an amount of Pr in a range of [1.5495, 4.821] (at. %), inclusive, or (9) an amount of Dy in a range of [0.2132, 5.3753] (at. %), inclusive, and

(10) an amount of Co in a range of [O, 4.0948] (at. %), inclusive,

(11) an amount of Cu in a range of [0.0545, 0.2445] (at. %), inclusive, and

(12) an amount of Fe in a range of [81.1749, 85.867] (at. %), inclusive.

In certain Aspects of this Embodiment the combination of Nd, Pr, and Dy is in a range of [13.236, 16.407] at. %, inclusive. In other Aspects, the composition comprises at least Nd. In other Aspects, the composition comprises Nd and Dy. In still other Aspects, the composition comprises both Nd and Pr.

Embodiment 12. The composition of any one of Embodiments 1 to 9, wherein the composition is substantially represented by the formula $AC_bR_xCo_yCu_dM_z$, wherein:

(A) AC comprises Nd and Pr in an atomic ratio in a range of from 0:100 to 100:0, and b is a value in a range of from about 5 atom % to about 65 atom %;

(B) R is one or more rare earth elements including one or both of Tb and Dy and x is a value in a value in a range of from about 5 atom % to about 75 atom %;

(C) Co is cobalt and Cu is copper;

(D) y is a value in a range of from about 20 atom % to about 60 atom %;

(E) d is a value in a range of from about 0.01 atom % to about 12 atom %;

(F) M is at least one transition metal element, exclusive of Cu and Co, and z is a value in a range of from about 0.01 atom % to about 18 atom %; and (G) b, x, y, d, and z are independently variable within their stated ranges provided that the sum of b+x+y+d+z is greater than 95, 98, 99, 99.5, 99.8, or 99.9 atom % to about 99.9 atom % is or 100 atom %.

Certain independent Aspects of this Embodiment include the subclasses and subranges described for this composition elsewhere herein.

Embodiment 13. The composition of any one of Embodiments 1 to 9, wherein the composition is substantially represented by the formula $Nd_jDy_kCo_mCu_nFe_p$, wherein:

j is atomic percent in a range from 1 to 2, 2 to 3, 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20 atom % or a range comprising two or more of these ranges, relative to the entire composition;

k is atomic percent in a range from 1 to 5, 5 to 10, 10 to 15, 15 to 20, 20 to 25, to 30, 30 to 35, 35 to 40, 40 to 45, 45 to 50, 50 to 55, 55 to 60 20 atom % or a range comprising two or more of these ranges, relative to the entire composition;

m is atomic percent in a range from 1 to 5, 5 to 10, 10 to 15, 15 to 20, 20 to 25, 25 to 30, 30 to 35, 35 to 40, 40 to 45, 45 to 50, 50 to 55, 55 to 60 atom % or a range comprising two or more of these ranges, relative to the entire composition;

n is atomic percent in a range from 0.1 to 0.5, 0.5 to 1, 1 to 1.5, 1.5 to 2, 2 to 2.5, 2.5 to to 3.5, 3.5 to 4, 4 to 4.5, 4.5 to 5, 5 to 5.5, 5.5 to 6, 6 to 6.5, 6.5 to 7, 7 to 7.5, 7.5 to 8, 8.5 to 9, 9 to 9.5, 9.5 to 10, 10 to 12, 12 to 14, 14 to 16, 16 to 18, 18 to 20 atom % or a range comprising two or more of these ranges, relative to the entire composition;

p is atomic percent in a range from 1 to 2, 2 to 3, 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20 atom % or a range comprising two or more of these ranges, relative to the entire composition; and j, k, m, n, and p are independently variable within their stated ranges provided that the sum of j+k+m+n+p is greater than 95, 98, 99, 99.5, 99.8, or 99.9 atom % to about 99.9 atom or 100 atom %.

Embodiment 14. The composition of an one of Embodiments 1 to 9, wherein the composition is substantially represented by the formula $Nd_{10\text{-}14}Fe_{1\text{-}5}Dy_{55\text{-}65}Tb_{0.01\text{-}0.5}Al_{0.01\text{-}1.5}Cu_{1\text{-}5}Co_{15\text{-}25}Pr_{0.01\text{-}0.5}Ga_{0.01\text{-}0.2}Co_{0.01\text{-}0.3}O_{0.001\text{-}0.1}$ atom %. Certain independent Aspects of this Embodiment include the subclasses and subranges described for this composition elsewhere herein.

In certain other independent Aspects of this Embodiment, the compositions comprise: $Nd_{12.95}Fe_{2.21}Dy_{59.27}Tb_{0.24}Al_{0.86}Cu_{3.28}Co_{20.69}Pr_{0.13}Ga_{0.19}C_{0.01}O_{0.17}$, $Nd_{13.44}Fe_{1.88}Dy_{61.54}Tb_{0.25}Al_{0.06}Cu_{3.12}Co_{19.279}Pr_{0.07}Ga_{0.19}C_{0.01}O_{0.17}$, $Nd_{13.95}Fe_{2.21}Dy_{59.27}Tb_{0.24}Al_{0.86}Cu_{3.28}Co_{20.69}Pr_{0.13}Ga_{0.95}Zr_{0.095}C_{0.01}O_{0.07}$, $Nd_{13.95}Fe_{2.21}Dy_{60.07}Tb_{0.24}Al_{0.06}Cu_{3.28}Co_{20.69}Pr_{0.13}Mo_{0.06}Ga_{0.095}Zr_{0.095}C_{0.01}O_{0.01}$, $Nd_{13.95}Fe_{2.21}Dy_{60.07}Tb_{0.24}Al_{0.06}Cu_{3.28}Co_{20.69}Pr_{0.15}Mo_{0.06}Ga_{0.095}Zr_{0.093}C_{0.001}O_{0.001}$ atom %, wherein each Embodiment 15. The composition of any one of Embodiments 1 to 9, wherein the composition is substantially represented by the formula:

(i) $Dy_2Fe_{14}B$,
(ii) $Pr_2Co_{14}B$,
(iii) $Pr_2Fe_{14}B$,
(iv) Nd metal (greater than 99 wt % Nd),
(v) Nd-oxide,
(vi) Nd-oxifluoride,
(vii) $NbB_2$,
(viii) $Nd_2Co_{14}B$,
(ix) NbFeB (e.g., $Nd_2Fe_{14}B$, and doped derivatives thereof),
(x) $Nd_2Ni_{14}B$,
(xi) Pr-oxide,
(xii) $Pr_2Ni_{14}B$,
(xiii) $Tb_2Co_{14}B$,
(xiv) $Tb_2Fe_{14}B$,
(xv) $Tb_2Ni_{14}B$,
(xvi) $CoNd_3$,
(xvii) GaNd,
(xviii) $NiNd_3$,
(xix) $Y_2O_3$,
(xx) Gd,
(xxi) SS316L (or any other grade of stainless steel),
(xxii) or a combination of two or more of these materials.

Embodiment 16. The composition of any one of Embodiments 1 to 15, wherein the substantially spherical particles have a combined carbon and oxygen content in a range of from 0 to 1700 ppm by weight relative to the entire weight of the particle as determined by Leco ONH836 Oxygen, Nitrogen and Hydrogen content analyzer and LECO CS844 Carbon and Sulfur determinator. In certain Aspects of this Embodiment, the combined carbon and oxygen content is in a range defined by one or more of the range of from 0 to 40, from 40 to 80, from 80 to 120, from 120 to 160, from 160 to 200, from 200 to 300, from 300 to 400, from 400 to 500, from 500 to 600, from 600 to 700, from 700 to 800, from 800 to 900, from 900 to 1000, from 1000 to 1100, from 1100 to 1200, from 1200 to 1300, from 1300 to 1400, from 1400 to 1500, from 1500 to 1600, and/or from 1600 to 1700 ppm by weight relative to the entire weight of the particle.

Embodiment 17. The composition of any one of Embodiments 1 to 16, wherein the substantially spherical particles have an oxygen content in a range of from 0 to 900 ppm by weight relative to the entire weight of the particle as determined by LECO ONH836 or CS744 element analyzers. In certain Aspects of this Embodiment, the oxygen content is in a range defined by one or more of the range of from 0 to 40, from 40 to 80, from 80 to 120, from 120 to 160, from 160 to 200, from 200 to 240, from 240 to 280, from 280 to 320, from 320 to 360, from 360 to 400, from 400 to 440, from 440 to 480, from 480 to 520, from 520 to 560, from 560 to 600, from 600 to 640, from 640 to 680, from 680 to 720, from 720 to 760, from 760 to 800, and/or from 800 to 900 ppm by weight relative to the entire weight of the particle.

Embodiment 18. The composition of any one of Embodiments 1 to 17, wherein the substantially spherical particles have a carbon content in a range of from 0 to 800 ppm by weight relative to the entire weight of the particle as determined by method of probe sampling in which the probe is immersed in the melt where the sample chamber in the probe fills by aspiration, followed by powder compaction and combustion technique to measure the carbon content. In certain Aspects of this Embodiment, the carbon content is in a range defined by one or more of the range of from 0 to 40, from 40 to 80, from 80 to 120, from 120 to 160, from 160 to 200, from 200 to 240, from 240 to 280, from 280 to 320, from 320 to 360, from 360 to 400, from 400 to 440, from 440 to 480, from 480 to 520, from 520 to 560, from 560 to 600, from 600 to 640, from 640 to 680, from 680 to 720, from 760 to 800 ppm, from 800 to 900, from 900 to 1000, from 1000 to 1100, from 1100 to 1200, from 1200 to 1300, and/or from 1300 to 1400 ppm by weight relative to the entire weight of the particle.

Embodiment 19. A method comprising impinging at least one inert fluid stream having a velocity of 0.2-10.5 km/sec onto a stream of a molten/liquid metallic alloy under appropriate conditions so as to produce a dispersion of substantially spherical solid particles of the metallic alloy within the inert fluid stream, the particles having a mean particle size in a range of 80 nm to 500 microns. In certain Aspects of this Embodiment, the molten/liquid metallic alloy comprises a composition of any one of the Embodiments 10 to 15.

Embodiment 20. The method of Embodiment 19, wherein the fluid comprises nitrogen, argon, helium, hydrogen, or a mixture thereof. In certain Aspects of this Embodiment, the fluid consists of nitrogen, argon, helium, or hydrogen. In other Aspects of this embodiment, the fluid temperatures is in a range of from minus 240° C. to Tt ° C., where Tt is a temperature that is at least 100° C. lower than the melting temperature of the metal or metal alloy sample.

Embodiment 21. The method of Embodiment 19 or 20, wherein the fluid is a liquid. In certain Aspects of this Embodiment, the fluid comprises nitrogen at 77 K at atmospheric pressure, argon at 87 K at atmospheric pressure, helium at 4 K at atmospheric pressure, or hydrogen 20.2 K at atmospheric pressure.

Embodiment 22. The method of Embodiment 19 or 20, wherein the fluid is a liquid.

Embodiment 23. The method of any one of Embodiments 19 to 22, wherein a plurality of inert fluid stream are impinged onto the stream of a molten/liquid metallic alloy, at least one of which has a velocity of 0.2-10.5 km/sec.

Embodiment 24. The method of any one of Embodiments 19 to 23, wherein at least one inert fluid stream impinges the stream of a molten/liquid metallic alloy at an oblique angle. In certain Aspects of this Embodiment, the oblique angle is in a range of 10° to about 89°, preferable in a range of from about 30° to about 60°.

Embodiment 25. The method of any one of Embodiments 19 to 24, wherein the molten/liquid metallic alloy is sprayed or directed into the inert fluid stream. In certain Aspects of this Embodiment, the degree of spray is between 20 to 90 degrees. In certain other Aspects of this Embodiment, a de Laval, conical, bell-shaped, contoured bell shape shortened, plug/aerospike, or expansion-defection type of nozzle can be used.

Embodiment 26. The method of any one of Embodiments 19 to 23, wherein the stream of molten/liquid metallic alloy is directed into a hot zone of a tangential reactor.

Embodiment 27. The method of Embodiment 26, wherein the hot zone is maintained at a temperature controlled to within ±10° C. variance or within of a set temperature.

Embodiment 28. The method of any one of Embodiments 19 to 27, wherein the appropriate reaction conditions are such that the combined carbon and oxygen content of the particles is in a range of from 0 to 1700 ppm by weight relative to the entire weight of the particle, including any one or more of the sub-ranges defined in Embodiment 16. In some Aspects of this Embodiment, the values are determined by a comparison of the weight-based particle size (equals the diameter of the sphere to obtain the volume of an appropriate particle which is then multiplied by the density, which is a characteristic of chemical composition of the particle.

Embodiment 29. The method of any one of Embodiments 19 to 28, wherein the substantially spherical solid particles of the metallic alloy are separated from the inert fluid stream by gravity. In certain Aspects of embodiments 19 to 28, the methods are used to prepare any one or more the compositions described in Embodiments 1 to 18.

Embodiment 30. A reactor comprising the features capable of affecting the method of any one of claims 19 to 29.

Embodiment 31. An green body article comprising a composition of any one or more of Embodiments 1 to 18, or containing a composition prepared by any one of the methods of Embodiments 19 to 29.

Embodiment 32. An article prepared by sintering a composition of any one or more of Embodiments 1 to 18 or 31, or by sintering a composition prepared by any one of the methods of Embodiments 19 to 29, in the absence or presence of a magnetic field. Sintering in the absence or presence of a magnetic field represent independent Aspects of this Embodiment.

Embodiment 33. A polymer composite comprising: a composition of any one or more of Embodiments 1 to 18, or containing a composition prepared by any one of the methods of Embodiments 19 to 29, and a polymer. In certain Aspects of this Embodiment, the polymer binder is a thermoplastic or thermoset polymer, for example a nitrile rubber, polyvinyl polymer, polyimide (e.g., nylon), polyphenylene sulfide (PPS), a polyester, a fluorinated or perfluorinated polymer (e.g., PTFE), or epoxy. In other Aspects of this Embodiment, the polymer composite is magnetized and characterized as a bonded magnet. In other Aspects of this Embodiment, the polymer composite is non-magnetic.

Embodiment 34. An electronic device comprising a sintered article of Embodiment 32 or a bonded magnet of Embodiment 33. In certain Aspects of this Embodiment, the motor or sensor is a motor, rotor, dipole magnet, sensor, magnetic torque coupler, a magnetic linear coupler, or a Halbach array. Other Aspects of this Embodiments includes a product incorporating these electronic devices, for example, a hard disk drive, optical disk drive motor, fax, copier and printer stepper motor, personal video recorder and mp3 music player, automobile instrument panel motor, automobile seat or window motor, air bag sensor, or fans. These products may also include head actuators for computer or tablet hard disks, erase heads, magnetic resonance imaging (MRI) equipment, magnetic locks, magnetic fasteners, loudspeakers, headphones or ear pods, mobile telephones and other consumer electronics, magnetic beatings and couplings, NMR spectrometers, electric motors (for example, as used in cordless tools, servomotors, compression motors, synchronous, spindle and stepper motors, electric and power steering, drive motors for hybrid and electric vehicles), and electric generators (including wind turbines).

Embodiment 35. Any one of the compositions, methods, or articles described in this specification, including the Examples.

EXAMPLES

The following Examples are provided to illustrate some of the concepts described within this disclosure. While each Example is considered to provide specific individual embodiments of composition methods of preparation and use, none of the Examples should be considered to limit the more general embodiments described herein. Each of the methods described in the examples may be applied to any composition within the scope of the present disclosure, and the invention is not limited to the application of these methods to the specific compositions described in the Examples.

In the following examples, efforts have been made to ensure accuracy with respect to numbers used (e.g. amounts, temperature etc.) but some experimental error and deviation should be accounted for. Unless indicated otherwise, temperature is in degrees C., pressure is at or near atmospheric.

Example 1

Preparing Powders—General Considerations

As described herein, atomized powder by pouring the melt, into the jet of inert gas or liquid media. Such powders produced have been prepared in a particle size range of 80 nanometers to 500 microns. Atomized powders prepared in the range of 100 nanometers to 300 microns have been demonstrated to have oxygen content in a range of from about 0.01 to about 900 ppm and carbon content in a range of from about 0.01 to 800 ppm. FIG. 1 shows an exemplary tangential/radial flow apparatus useful in preparing the uniform, substantially spherical particles. In this apparatus, designated by elements 11 and 14, elements 10, 12, and 13 shows the inlet portal and flow management systems (feeds) for the injection of the inert, gas or liquid streams (feeds), and element 16 show the channel for the introduction of liquid or molten metals. The arrow emanating from inlet 10 shows the tangential pattern of the inert gas or liquid ejected through tangentially-aimed slots. The tangential pattern of the inert gas flow may help remove particles from the inside walls of the apparatus. The inert gas or liquid streams from elements 12 directs the molten metal radially into the tangential gas or liquid flow derived from element 10. The inert gas or liquid streams from element 13 direct the formed powders out of the reactor. In preferred embodiments, the apparatus (11 and 14) controls the temperature within 0.1° C. of the desired temperature degrees Celsius by means of a standard thermal imaging device integrated within a pyrometer.

Example 2

Preparing Powders Containing Rare Earth Elements

Example 2.1

A charge of 50 kg material in form of elements Nd, Fe, Dy, Tb, Al, Cu, Co, Pr, Ga was loaded in a crucible in a casting chamber (see Table 1). The chamber was evacuated three times and purged with inert gas (either argon or nitrogen) at least three times so that the oxygen level was below detection limits; i.e., well less than 1 ppm. The crucible in the chamber was heated up to 1470° C., the melting temperature of NdFeB type material. The melt was poured through a turn dish into a jet of high velocity inert gas (argon nitrogen) producing spherical particle in the range of 100 nanometers to 3 microns. The ICP and elemental analysis on the composition of the spherical particles was:

TABLE 1

ICP Analyses for Composition, Triplicate Measurements

| Element | Wt % 1 | Wt % 2 | Wt % 3 | Element | Wt % 1 | Wt % 2 | Wt % 3 |
|---|---|---|---|---|---|---|---|
| Nd | 12.95 | 13.44 | 13.45 | Co | 20.69 | 19.27 | 19.28 |
| Fe | 2.21 | 1.88 | 1.90 | Pr | 0.13 | 0.07 | 0.08 |
| Dy | 59.27 | 61.54 | 61.50 | Ga | 0.19 | 0.19 | 0.18 |
| Tb | 0.24 | 0.25 | 0.25 | C | 0.01 | 0.01 | 0.01 |
| Al | 0.86 | 0.06 | 0.05 | O | 0.17 | 0.17 | 0.17 |
| Cu | 3.28 | 3.12 | 3.13 | | | | |

TABLE 1-continued

ICP Analyses for Composition, Triplicate Measurements

Example 2.2

A number of experiments were performed in order to characterize the relationship between the atomization gas (Ar) pressure, particle size and cooling rates. Results are reported on the following Table 2. For a given reactor, the injection velocity is represented by, and varies with, the head pressure of the reservoir feeding the corresponding injection nozzle. Likewise, the impingement energy provided by the impinging cooling fluid relates to the angle of incidence between the impinging cooling fluid and the molten/liquid metal or alloy. In Table 2, the configuration of the dimensions and impinging angles of the injection ports were held constant.

TABLE 2

Effect of Energy of Impingement on Particle Size

| Ex | Inert Gas Head Pressure (bar) | Particle Size (micron) | Cooling rates (K/second) |
|---|---|---|---|
| 1 | 10 | 100-250 | $1 \times 10^3$ |
| 2 | 20 | 80-100 | $1 \times 10^4$ |
| 3 | 30 | 50-80 | $1 \times 10^5$ |
| 4 | 50 | 10-40 | $1 \times 10^6$ |
| 5 | 70 | 10-1 | $1 \times 10^6$ |
| 6 | 80 | 0.5-1 | $1 \times 10^6$ |
| 7 | 100 | 0.1-1 | $1 \times 10^6$ |

Example 2.3

Homogeneity vs. Particle Size. Table 3 shows the ability to prepare powders of different sizes without substantially variability of composition as a function of size,

TABLE 3

Effect of particle size on homogeneity vs. particle size. Data are in wt %.

| Element | 100 nm | 1 micron | 3 μm | 50 μm | 100 μm | 200 μm | 500 μm |
|---|---|---|---|---|---|---|---|
| PrNd | 0.00 | 0.01 | 0.00 | 0.01 | 0.00 | 0.00 | 0.0 |
| Nd | 11.58 | 11.50 | 11.53 | 11.52 | 11.51 | 11.59 | 11.56 |
| Pr | 0.85 | 0.95 | 0.78 | 0.91 | 0.69 | 0.80 | 0.89 |
| Dy | 20.92 | 20.89 | 20.85 | 20.55 | 20.33 | 20.80 | 20.75 |
| Tb | 21.10 | 21.147 | 20.93 | 21.51 | 21.57 | 21.13 | 21.51 |
| Co | 37.96 | 38.07 | 38.40 | 38.26 | 38.31 | 38.18 | 37.75 |
| Cu | 5.57 | 5.42 | 5.50 | 5.25 | 5.57 | 5.50 | 5.53 |
| Zr | 0.00 | 0.00 | 0.00 | 0.00 | 0.00 | 0.00 | 0.00 |
| V | 0.00 | 0.00 | 0.00 | 0.00 | 0.00 | 0.00 | 0.00 |
| Ga | 0.00 | 0.00 | 0.00 | 0.00 | 0.00 | 0.00 | 0.00 |
| Ti | 0.00 | 0.00 | 0.00 | 0.00 | 0.00 | 0.00 | 0.00 |
| Nb | 0.00 | 0.00 | 0.00 | 0.00 | 0.00 | 0.00 | 0.00 |
| C | 0.001 | 0.001 | 0.001 | 0.000 | 0.000 | 0.001 | 0.001 |
| O | 0.001 | 0.001 | 0.000 | 0.001 | 0.000 | 0.000 | 0.001 |
| Ga | 0.00 | 0.00 | 0.00 | 0.00 | 0.00 | 0.00 | 0.00 |
| Al | 0.00 | 0.00 | 0.00 | 0.00 | 0.00 | 0.00 | 0.00 |
| Mn | 0.00 | 0.00 | 0.00 | 0.00 | 0.00 | 0.00 | 0.00 |
| Gd | 0.00 | 0.00 | 0.00 | 0.00 | 0.00 | 0.00 | 0.00 |
| Fe | 2.02 | 2.02 | 2.01 | 1.99 | 2.02 | 2.01 | 2.01 |

Example 3

Preparing Powders for NdFeB Production—Effect of Submicron Particle Size on Magnet Characterization

Example 3.1

Figure 3:
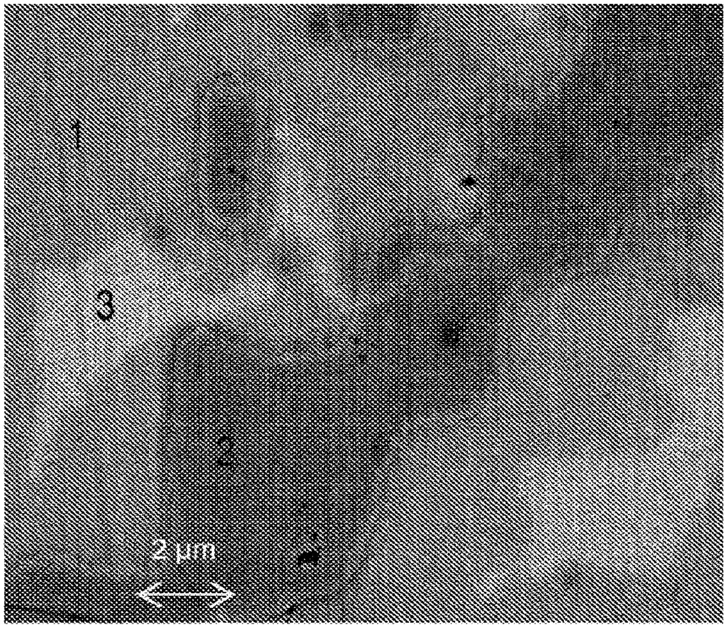
FIG. 3 shows the microstructure of the product produced in Example 3.1. The phases present are identified as (1) matrix of $Dy_{10}Co_6Nd_3Cu$; (2) dendrite of $Dy_{23}Co_{36}NdFe_{10}$; and (3) phase of $Dy_{20}Co_{15}Nd_8Cu_4FeO_3$.

A charge of 50 kg material in form of elements Nd (13.2 wt %), Dy (58 wt %), Fe (0.8 wt %) Cu (4.00 wt %), Co (23.00 wt %), Nb (0.2 wt %), and O (0.8 wt %) was loaded in a crucible in a casting chamber. The chamber was evacuated three times and purged with inert gas (argon was used in this example) at least three times so that the oxygen level was below detection limits; i.e., <1 ppm. The crucible in the chamber was heated to 1470° C. The melt was poured through a turn dish into a jet of high velocity inert gas (argon) producing spherical particle in the range of 100 nanometers to 3 microns. The microstructure of this so-produced alloy is shown in FIG. 3. The measured resistivity for this alloy ranged between 124 and 257 μΩ*cm, and the measured density was 8.064 g/cm$^3$. Table 4 shows the results of the EDS analysis of this composition:

TABLE 4

EDS analysis of composition of Example 3.1

| | Values by EDS (theoretical based on stoichiometry*) | | | | | | |
|---|---|---|---|---|---|---|---|
| | Nd, wt % | Dy, wt % | Fe, wt % | Cu, wt % | Co, wt % | Nb, wt % | O, wt % |
| Bulk** | 13.20 | 58 | 0.8 | 4.00 | 23.00 | 0.2 | 0.8 |
| Matrix (1) | 15.87 | 66.69 | 0 (0) | 2.55 | 14.89 | 0 | 0(0) |
| | (17.48) | (65.66) | | (2.57) | (14.29) | | |
| Dendrite (2) | 2.19 | 56.46 | 8.3 | 0 (0) | 32.96 | 0.1 | 0 (0) |
| | (2.20) | (56.96) | (8.5) | | (32.30) | | |
| Gray Phase 3 | 21.89 | 57.66 | 1.01 | 0 (0) | 15.02 | 0 | 0.7 |
| | (20.44) | (57.56) | (0.99) | | (15.66) | | (0.85) |

*Stoichiometries read as Matrix (1): $Dy_{10}Co_6Nd_3Cu_1$, Dendrite (2): $Dy_{23}Co_{36}Nd_1Fe_{10}$; Gray Phase (3): $Dy_{20}Co_{15}Nd_8Cu_4Fe_1O_3$

**As-prepared, based on original charge

This additive material is provided as an exemplar or surrogate of the materials described by the GBM alloys of any one of the embodiments of the general formula $AC_bR_x$-$Co_yCu_dM_z$, and of the compositions of the general formula: $Nd_jDy_kCo_mCu_nFe_p$, including $Nd_{1-20}Dy_{1-60}Co_{1-20}Cu_{0.1-1.20}Fe_{1-20}$, especially where these compositions are Dy-rich (e.g., where Dy, Tb, or a combination thereof is in a range of from 30-60 at %), such are described elsewhere herein.

Example 3.2

Effect of Particle Size on Magnet Character

A set of NdFeB powders was prepared from a stoichiometric Nd2Fe14B1 composition (12.3 at % Nd; 81.7 at % Fe, and 6 at % B) with 94-98% of the composition described in Example 3.1, above, in which the powder was atomized at a pressure of 75-100 bar, respectively. These powders, designated UM00001, UM00002 and UM00003, were characterized as having elemental characteristics as shown in Table 5. The powders otherwise differed only in their particle size distributions (see FIGS. 4, 5, and 6), and again it is shown that the compositions are effectively independent of particle size.

TABLE 5

ICP Elemental analysis of powders designated UM00001, UM00002 and UM00003

| | Nd | Pr | Dy | Ti | Co |
|---|---|---|---|---|---|
| UM00001 | 28.33 | 0.26 | 2.12 | 0 | 1.67 |
| UM00002 | 28.10 | 0.23 | 2.25 | 0 | 1.84 |
| UM00003 | 28.39 | 0.31 | 1.98 | 0 | 1.32 |
| | **Cu** | **Zr** | **B** | **V** | **Ga** |
| UM00001 | 0.15 | 0 | 0.93 | 0 | 0.03 |
| UM00002 | 0.20 | 0 | 1 | 0 | 0.04 |
| UM00003 | 0.23 | 0 | 1.07 | 0 | 0.06 |
| | **Si** | **Cr** | **Ni** | **Mo** | **O** |
| UM00001 | 0 | 0 | 0 | 0 | 1 |
| UM00002 | 0 | 0 | 0 | 0 | 0.9 |
| UM00003 | 0 | 0 | 0 | 0 | 1.1 |
| | **Al** | **Mn** | **Fe** | **C** | **Ca** |
| UM00001 | 0.25 | 0.06 | 64.5 | 0.6 | 0 |
| UM00002 | 0.21 | 0.11 | 64.57 | 0.55 | 0 |
| UM00003 | 0.32 | 0.12 | 64.39 | 0.7 | 0 |

TABLE 5-continued

ICP Elemental analysis of powders designated UM00001, UM00002 and UM00003

| | S | Nb | P | La |
|---|---|---|---|---|
| UM00001 | 0 | 0 | 0 | 0 |
| UM00002 | 0 | 0 | 0 | 0 |
| UM00003 | 0 | 0 | 0 | 0 |

TABLE 6

Figure 4:
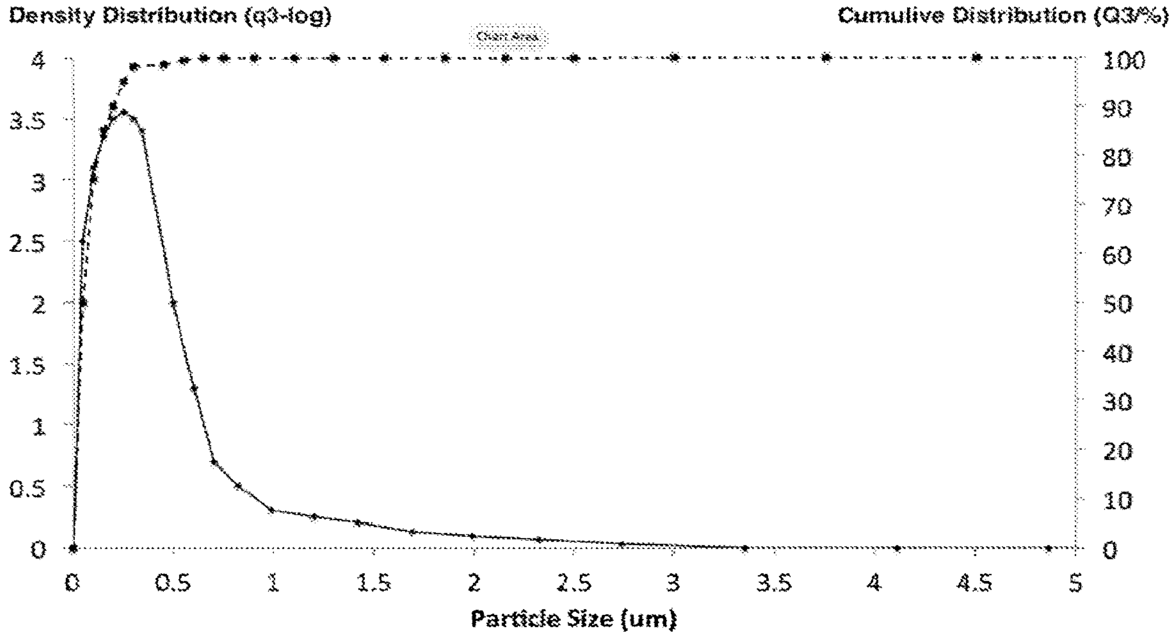
FIG. 4: Particle size distribution of UM0001 magnet produced with powder produced as described in Example 3.2. D50=0.36 μm, D10=0.27 μm, D90=0.44 μm.
Figure 5:
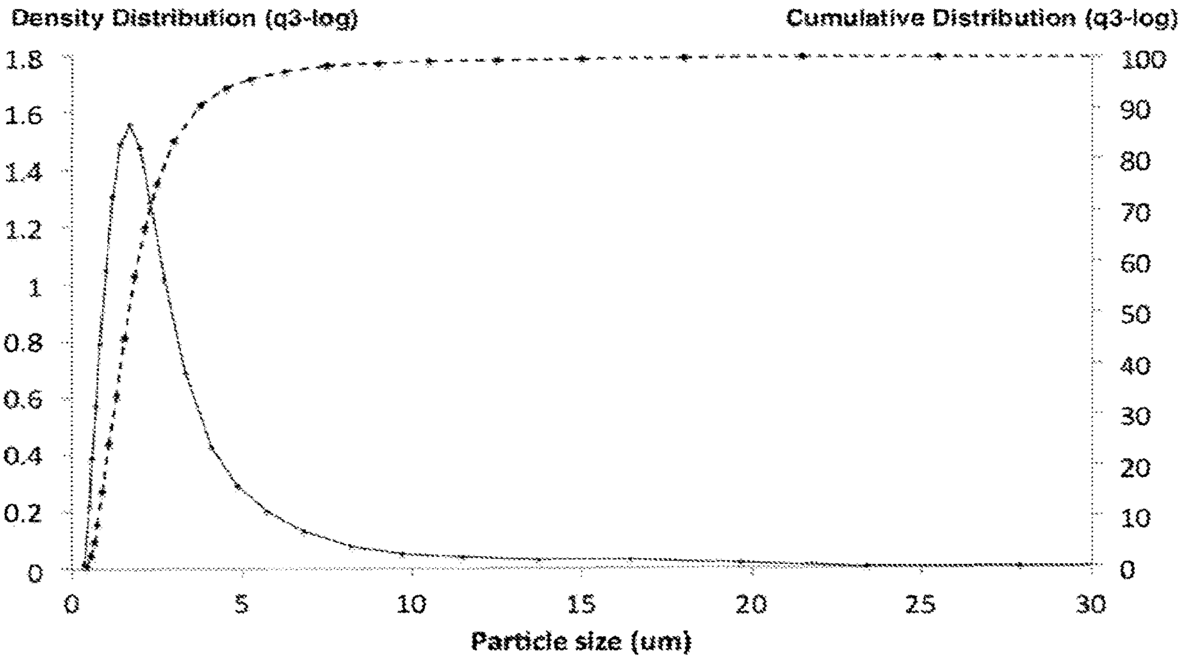
FIG. 5: Particle size distribution of UM0002 magnet produced with powder produced as described in Example 3.2. D50=1.67 μm, D10=0.78 μm, D90=3.73 μm.
Figure 6:
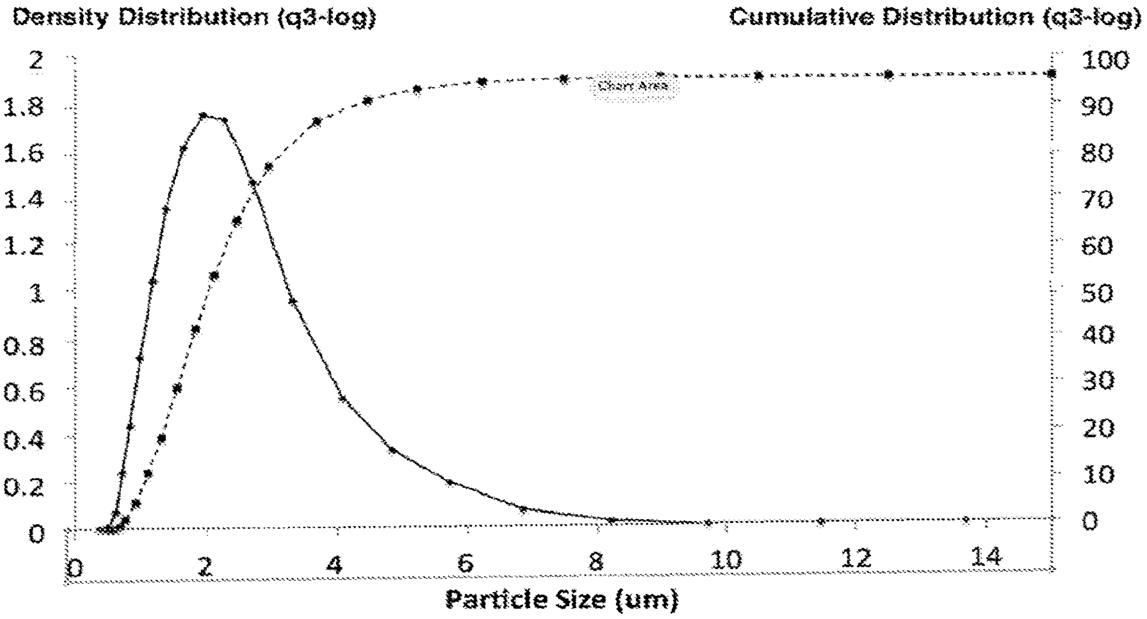
FIG. 6: Particle size distribution of UM0003 magnet produced with powder produced as described in Example 3.2. D50=2.004 μm, D10=1.04 μm, D90=4.29 μm.

Particle size distributions of powders designated UM00001, UM00002 and UM00003 (see also FIGS. 4, 5, and 6).

| | D50, microns | D10, microns | D90, microns |
|---|---|---|---|
| UM00001 | 0.36 | 0.27 | 0.44 |
| UM00002 | 1.67 | 0.78 | 3.73 |
| UM00003 | 2.04 | 1.04 | 4.29 |

These powders were processed by compacting in a die with dimensions, 60×80×40 mm with the alignment field in the 40 mm direction. Compaction occurred in an inert atmosphere with less than 5 ppm oxygen. The compaction force used was 1100 kN and the alignment field, which was energised three times during the compaction process was 2.4 T. The removed green compact from the press was then sintered to near full density using standard vacuum sintering conditions at a temperature ranging between 1000° C. and 1100° C. for 24 hours, and annealed for 10 hours at a temperature ranging between 800° C. and 900° C. to produce magnets having the characteristics shown in Table 7. These magnets, also designated UM00001, UM00002 and UM00003, from their respective powders, were compared with six commercially available materials produced via traditional powder metallurgy routes reported in previous patents and with similar magnetic properties.

TABLE 7

Summary of measured magnetic and electrical resistivity and thermal stability properties of the magnets used for the comparison. The compositional homogeneity of the UM magnets were extremely high, with intra-batch variability being extremely low for Br (3.7 mT, <0.3%), Hcj (4.5 kA/m, <0.25%), and $BH_{max}$ (4.8 kJ/m$^3$, <1.5%)

| | Br (mT) | Hcj (kA/m) | $BH_{max}$ (kJ/m$^3$) | Resistivity (μΩ*cm) | A (%/° C.) |
|---|---|---|---|---|---|
| UM00001 | 1275 | 2160 | 318 | 183 | −0.065 |
| UM00002 | 1268 | 1983 | 332 | 186 | −0.078 |
| UM00003 | 1282 | 1954 | 333 | 190 | −0.082 |

TABLE 7-continued

Summary of measured magnetic and electrical resistivity and thermal stability properties of the magnets used for the comparison. The compositional homogeneity of the UM magnets were extremely high, with intra-batch variability being extremely low for Br (3.7 mT, <0.3%), Hcj (4.5 kA/m, <0.25%), and $BH_{max}$ (4.8 kJ/m$^3$, <1.5%)

| | Br (mT) | Hcj (kA/m) | $BH_{max}$ (kJ/m$^3$) | Resistivity (μΩ*cm) | A (%/° C.) |
|---|---|---|---|---|---|
| Hitachi-NMX-41SH | 1280 | 1695 | 328 | 145 | −0.11 |
| TDK NEOREC 48 DUH | 1350 | 2010 | 350 | 150 | −0.12 |
| Shinetsu N42SH-R | 1278 | 1750 | 315 | 146 | −0.10 |
| Intermagnetics N38UH1 | 1224 | 2150 | 290 | 151 | −0.10 |
| Earth Panda 38SH | 1260 | 1724 | 295 | 148 | −0.11 |
| VAC VACODYM 965 AP | 1250 | 1995 | 315 | 150 | −0.10 |

These materials were examined using low temperature DSC analyses in the range 200° C. to 500° C., in an attempt to infer of the effect of particle size on the diffusivity of the different elemental species present in the starting composition. The test conditions used in the DSC were to hold the sample in a high purity alumina crucible in a flow of high purity argon and a heating rate of 20° C./min. Sample mass for all the samples was 130+/−5 mg. The samples were wire cut from the original material and then cleaned for three minutes in a ultrasonic bath of Isopropyl alcohol. The results are shown in FIG. 7.

Figure 7:
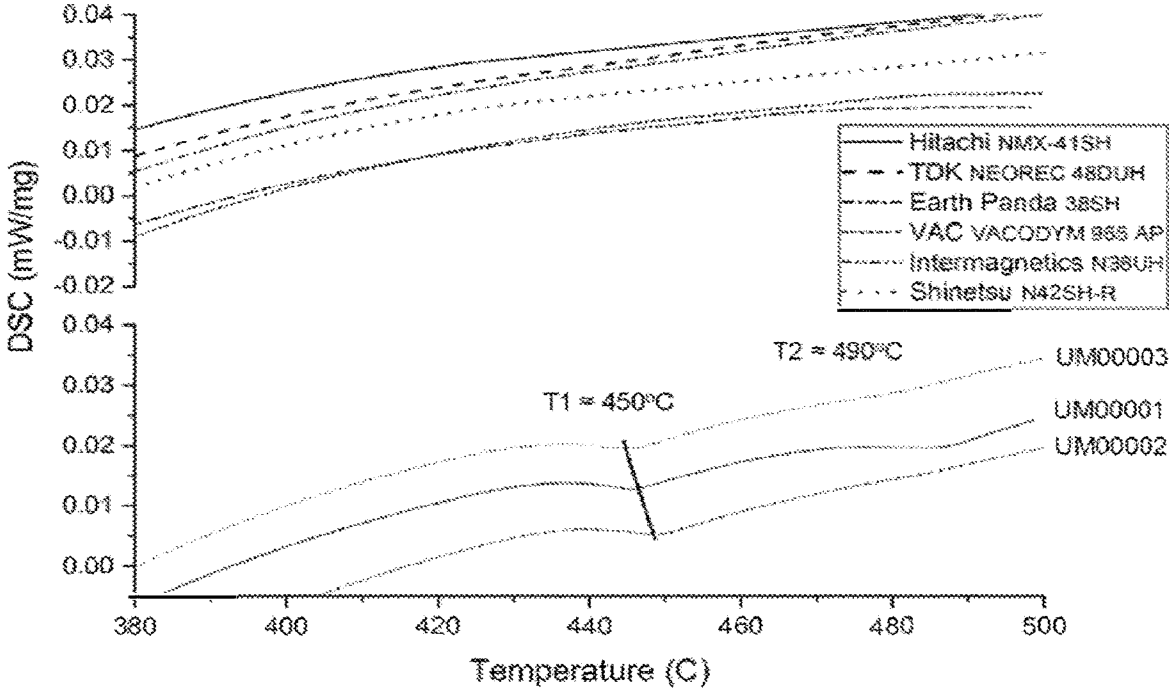
FIG. 7 shows DSC curves over the temperature raise of 380° C. to 500° C. for three inventive and six commercially available magnetic materials, showing the effect of precursor particle size on the presence or absence of characteristic endotherms.

The heating DSC curves of FIG. 7 show the presence of one or two endothermic peaks, depending on the size of the grain boundary modifying UM powders, in the UM series magnets in a range that goes from above the Curie point to 500° C. This is an unprecedented feature, consequence of the improved diffusivity and increased free energy due to micron to sub micron particle size.

In the three examples of the UM series the only difference in the production process was the starting particle size distribution. It was apparent that two peaks were present in the UM00001 magnet where D50 was equal to 360 nm and one peak was present for the UM00002 and UM00003 magnets where D50 was higher than 1 micron. Resistivity for these processed UM series magnets was up to 30% higher than reported for commercial magnets.

While not intending to be bound by the correctness of any particular theory, this observation is consistent with a new grain boundary phase responsible for exchange decoupling of the grains constituting the magnetic phase. The novel microstructure is responsible for improved coercivity 1954 to 2160 kA/m, resistivity 180 micro-ohm-cm, thermal stability −0.06 to −0.082%/° C., in magnets containing lower content of heavy rare earths compared with commercial magnets. A unique DSC fingerprint with a single or double endothermic peak in the range 430-490° C. was also detectable with the addition of the additive.

The beneficial effects of the complex additions as detailed throughout this disclosure and within this example (as represented by the alloy of Example 3.1 as being reflective of any one of any one of the embodiments of the general formula $AC_bR_xCo_yCu_dM_z$, and of the compositions of the general formula: $Nd_jDy_kCo_mCu_nFe_p$, including $Nd_{1-20}Dy_{1-60}Co_{1-20}Cu_{0.1-1.20}Fe_{1-20}$, especially where these compositions are Dy-rich (e.g., where Dy, Tb, or a combination thereof is in a range of from 30-60 at %), such are described elsewhere herein), result in increased electrical resistivity, improved thermal stability, and are not manifested if less complex additions are added to Nd2Fe14B-type phases.

Example 3.3

Discussion

The properties attributed to materials synthesized within the processes described herein using sub-micron particle. Permanent magnetic materials produced may exhibit a characteristic DSC trace (FIG. 7) and increased electrical resistivity (Table 7) when compared to available commercial magnets The process involves the addition of the additives described herein. Addition of the additive may be in the form of a blended powder or alloy which has been added to Nd2Fe14B-type material.

These NdDyCuCoFe additives and the Nd2Fe14B-type phase may react at elevated temperatures (1050-1085° C.) or at an annealing temperature (400-950° C.), notably when a liquid phase is present, where a new localised alloy forms in proximity to the additive alloy and the Nd2Fe14B-type phase. This new alloy forms by a process of diffusion, furthermore this process of diffusion is effected by the combination of elements found in the additive material. This diffusion process is controlled by interdiffusion through the lattice and substitutional diffusion of elements within the lattice structure, for example but not limited to Nd and Pr can substitute within the lattice. The concentration gradient of elements effects the rate of diffusion, with higher rates of diffusion present where large gradients exist. Oxygen, which is present in the additive and Nd2Fe14B-type phase also plays an important role in the diffusion of the additive into the Nd2Fe14B-type phase. The combination of this diffusion process results in the formation of a film of the additive alloy or new alloy surrounding the Nd2Fe14B-type phase. This film has been identified by SEM/Optical analysis on processed material. The beneficial effect of this film on magnetic properties has been physically characterised by electrical resistivity measurements, magnetic measurements at a range of temperatures and DSC measurements. Measured magnetic properties at elevated temperatures show an enhanced thermal stability for magnets produced with the additive alloy described herein. The beneficial effects of the complex additions as detailed throughout this work. For example increased electrical resistivity, were not manifested if less complex additions were added to Nd2Fe14B-type phases, therefore the development and understanding of the effect of the additive alloy described herein was not obvious to someone skilled in the art of Nd2Fe14B-type magnetic materials, as the improvements in electrical resistivity and thermal stability of the magnets depended on the interdependence of a complex composition, and not the single dependence of any one component.

The presence of one or two endotherms as shown in FIG. 7 appears to be a signature characteristic of these alloys, when compared to other type of commercial magnets, and so represents materials FeNdB type magnetics exhibiting these endotherms in DSC traces represent other embodiments of the present invention(s) in some embodiments, the first endotherm appears at a temperature about 450° C., for example, in a range of from 430° C. to 470° C., from 435° C. to 465° C., or from 440° C. to 460° C. depending on the size and specific composition of the grain boundary material. In other embodiments, the second endotherm appears at a temperature about 490° C., for example, in a range of from 470° C. to 510° C., from 475° C. to 505° C., or from 480° C. to 500° C. depending on the size and specific composition of the grain boundary material. In this example elements containing representative composition of Example 3.1 would couple in such a way and at which point they would diffuse to produce concentration profile of e.g. a Dy-rich profile within a grain, which reacts with the Nd2Fe14B matrix grain to form the multiple core structure. The reaction would likewise be carried out under high vacuum and elevated temperature (1050-1085° C. and 490-950° C.) conditions to obtain the benefit of low energy eutectic and to maintain the grain boundary phase liquid, which is to solidify at 350° C. It is well known that the effective diffusion coefficient described by the Hart's equation is dependent on particle size, i.e. a smaller particle size allows for higher diffusivity $$D^{eff}=fD_{gb}+(1-f)D_l.$$

where $D^{eff}$=effective diffusion coefficient.

$D_{gb}$=grain boundary diffusion coefficient.

$D_l$=lattice diffusion coefficient.

f=q/Dδ q=value based on grain shape, 1 for parallel grains, 3 for square grains.

D=average grain size.

δ=grain boundary width, often assumed to be 0.5 nm.

Example 3.4

Magnet Performance

Figure 8:
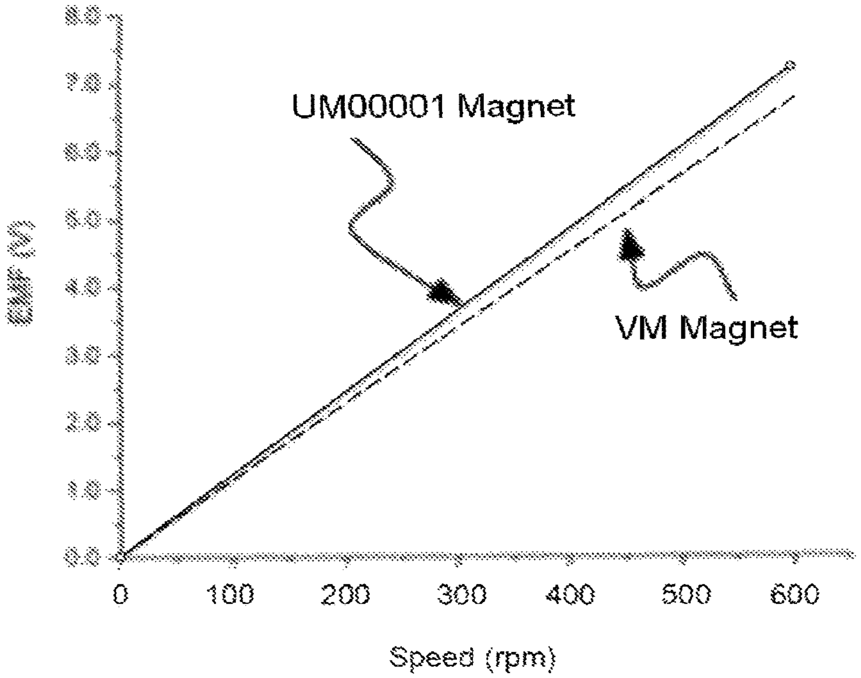
FIG. 8 and FIG. 9 show property data for the experiments described in Example 3.4.
Figure 9:
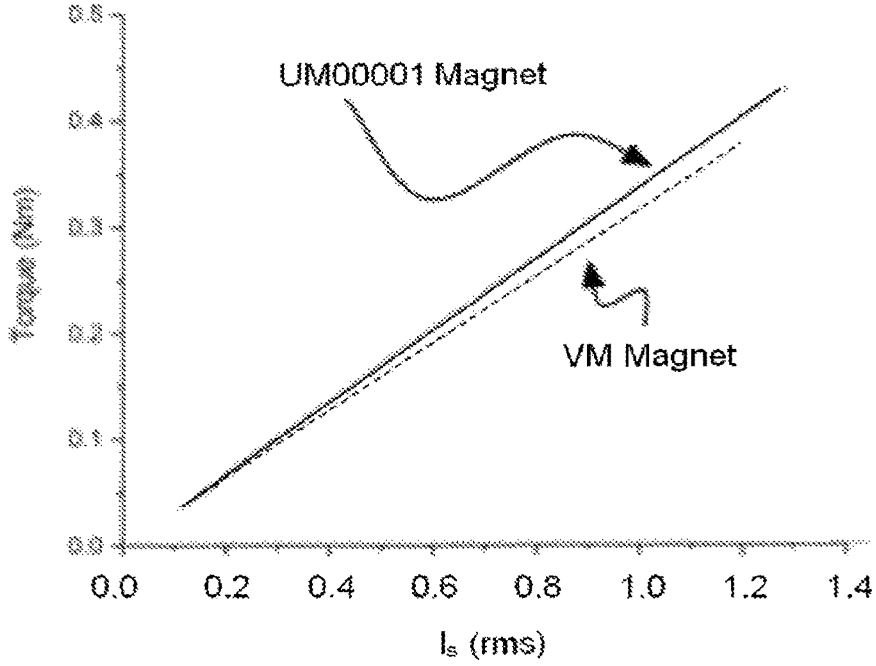

A performance comparison was made between a motor separately equipped with two identical rotors, the first made of the magnet described as UM00001 in Example 3.2 and the second with virgin magnet as supplied by the motor manufacturer. The flux linkage measured at open circuit and the torque measured at close circuit were respectively 7.0% and 6.4% higher for UM00001 magnet when compared to the VM magnet. These differences in magnetic properties between the two magnets was also reflected in the differences of motor performance as shown in FIG. 8 and FIG. 9.

Example 4

Bonded Magnets

Bonded magnets were prepared, using powders designated UBM1 and UBM2 which were prepared from a stoichiometric Nd2Fe14B1 composition with 1-5% of the composition described in Example 2, above. The powders were atomized at a pressure of 85 bar and 70 bar, respectively, resulting in D50 particle sizes for UBM1 and UBM2 powders of 0.99 μm and 2.6 μm respectively. Again, as in Example 3, the stoichiometries used in Example 2 are intended to be reflective of, and act as exemplars or surrogates for, the materials described by the GBM alloys of any one of the embodiments, of the general formula $AC_bR_x$-$Co_yCu_dM_z$, and of the compositions of the general formula: $Nd_jDy_kCo_mCu_nFe_p$, including $Nd_{1-20}Dy_{1-60}Co_{1-20}Cu_{0.1-20}Fe_{1-20}$, especially where these compositions are Dy-rich (e.g., where Dy, Tb, or a combination thereof is in a range of from 30-60 at %), such are described elsewhere herein. These powders were then mixed with 7% of an epoxy polymer binder before pressing in a 2.55 T field and fully curing the polymer binder for 3 hrs at 110° C.

Figure 10:
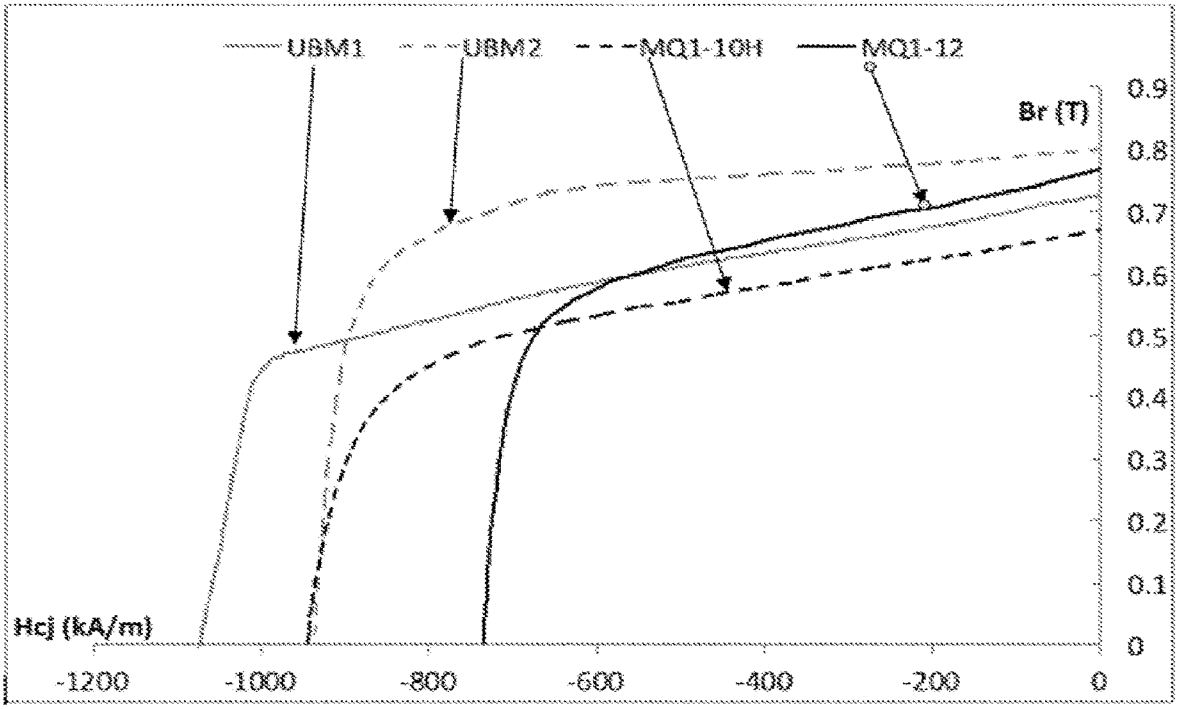
FIG. 10 shows comparative performances of bonded magnets comprising two of the inventive compositions and two commercial products.

The results (FIG. 10) of testing these materials in comparison with two commercially available bonded magnets from Magnequench Technology, shows that it is possible to produce a high performance bonded NdFeB-based magnets in which the magnetic properties of coercivity visibly exceed that of a commercial MQ1-10H and very closely match that of the commercial MQ1-12 magnet comparison. The results also shown that the remanence can also be enhanced for the UBM2 bonded magnet.

As those skilled in the art will appreciate, numerous modifications and variations of the present invention are possible in light of these teachings, and all such are contemplated hereby. For example, in addition to the embodiments described herein, the present invention contemplates and claims those inventions resulting from the combination of features of the invention cited herein and those of the cited prior art references which complement the features of the present invention. Similarly, it will be appreciated that any described material, feature, or article may be used in combination with any other material, feature, or article, and such combinations are considered within the scope of this invention.

Each patent, patent application, and publication cited or described in this document is hereby incorporated herein by reference, each in its entirety, for all purposes.

The invention claimed is:

1. A method comprising impinging at least one inert fluid stream having a velocity of 0.2-10.5 km/sec onto a stream of a molten or liquid metallic alloy under appropriate conditions so as to produce a dispersion of substantially spherical solid particles of the metallic alloy within the at least one inert fluid stream, the particles having a mean particle size in a range of 80 nm to 500 microns; and wherein the molten or liquid metallic alloy is represented by the formula $Nd_jDy_kCo_mCu_nFe_p$, wherein:

j is atomic percent in a range from 1 to 20 atom %, relative to the entire composition;

k is atomic percent in a range from 1 to 60 atom %, relative to the entire composition;

m is atomic percent in a range from 1 to 60 atom %, relative to the entire composition;

n is atomic percent in a range from 0.1 to 20 atom %, relative to the entire composition;

p is atomic percent in a range from 1 to 20 atom %, relative to the entire composition; and j, k, m, n, and p are independently variable within their stated ranges provided that the sum of j+k+m+n+p is greater than 95 atom %.

2. The method of claim 1, wherein the at least one inert fluid stream comprises nitrogen, argon, helium, hydrogen, or a mixture thereof.

3. The method of claim 1, wherein the at least one inert fluid stream is a liquid.

4. The method of claim 1, wherein the at least one inert fluid stream is a gas.

5. The method of claim 1, wherein the at least one inert fluid stream comprises a plurality of inert fluid streams that are impinged onto the stream of a molten or liquid metallic alloy, at least one of the inert fluid streams has a velocity of 0.2-10.5 km/sec.

6. The method of claim 1, wherein the at least one inert fluid stream impinges the stream of a molten or liquid metallic alloy at an oblique angle.

7. The method of claim 1, wherein the molten or liquid metallic alloy is directed into the inert fluid stream.

8. The method of claim 1, wherein the stream of molten or liquid metallic alloy is directed into a hot zone of a tangential reactor.

9. The method of claim 8, wherein the hot zone is maintained at a temperature controlled to within ±10° C. variance or within ±5% of a set temperature.

10. The method of claim 1, wherein the appropriate reaction conditions are such that the combined carbon and oxygen content of the particles is in a range of from 0 to 1700 ppm by weight relative to the entire weight of the particle.

11. The method of claim 1, wherein the substantially spherical solid particles of the metallic alloy are separated from the inert fluid stream by gravity.

12. The method of claim 1, wherein the alloy is present as:
$Nd_{1\text{-}14}Dy_{30\text{-}50}Co_{25\text{-}45}Cu_{1\text{-}10}Fe_{1\text{-}10}$ atom % or
$Nd_{8.5\text{-}12.5}Dy_{35\text{-}45}Co_{32\text{-}41}Cu_{3\text{-}6.5}Fe_{1.5\text{-}5}$ atom %.

13. The method of claim 1, wherein the alloy is present as: $Nd_{1\text{-}14}Dy_{30\text{-}50}Co_{25\text{-}45}Cu_{1\text{-}10}Fe_{1\text{-}10}$ atom %.

14. The method of claim 1, wherein the alloy is present as: $Nd_{8.5\text{-}12.5}Dy_{35\text{-}45}Co_{32\text{-}41}Cu_{3\text{-}6.5}Fe_{1.5\text{-}5}$ atom %.

* * * * *